US008631350B2

(12) United States Patent  
Lepage et al.

(10) Patent No.: US 8,631,350 B2
(45) Date of Patent: Jan. 14, 2014

(54) GRAPHICAL CONTEXT SHORT MENU

(75) Inventors: Marc Anthony Lepage, Kanata (CA); Adam Cooper, Ottawa (CA); Craig James Tucker, Chicago, IL (US); Yoojin Hong, Palo Alto, CA (US)

(73) Assignee: BlackBerry Limited, Waterloo (CA)

( * ) Notice: Subject to any disclaimer, the term of this patent is extended or adjusted under 35 U.S.C. 154(b) by 131 days.

(21) Appl. No.: 13/092,850

(22) Filed: Apr. 22, 2011

(65) Prior Publication Data

US 2011/0265035 A1 Oct. 27, 2011

Related U.S. Application Data

(60) Provisional application No. 61/327,586, filed on Apr. 23, 2010.

(51) Int. Cl.
*G06F 3/048* (2013.01)
(52) U.S. Cl.
USPC ............................ 715/810; 715/813; 715/815
(58) Field of Classification Search
USPC ......... 715/810, 811, 812, 813, 815, 817, 828, 715/829, 840
See application file for complete search history.

(56) References Cited

U.S. PATENT DOCUMENTS

| | | | |
|---|---|---|---|
| 5,745,717 A | 4/1998 | Vayda et al. | |
| 5,805,167 A | 9/1998 | Van Cruyningen | |
| 6,469,719 B1 * | 10/2002 | Kino et al. | 715/810 |
| 2004/0001105 A1 * | 1/2004 | Chew et al. | 345/817 |
| 2004/0221243 A1 | 11/2004 | Twerdahl et al. | |
| 2005/0119031 A1 | 6/2005 | Spalink et al. | |
| 2005/0257170 A1 | 11/2005 | Kim et al. | |
| 2007/0198949 A1 | 8/2007 | Rummel | |
| 2009/0217311 A1 | 8/2009 | Kocyan et al. | |

FOREIGN PATENT DOCUMENTS

| | | |
|---|---|---|
| EP | 1376325 A2 | 1/2004 |
| EP | 1693738 A1 | 8/2006 |
| EP | 2020634 A1 | 11/2007 |
| EP | 2040154 A2 | 8/2008 |
| EP | 2136290 A2 | 6/2009 |
| WO | 2004017227 A1 | 2/2004 |

OTHER PUBLICATIONS

Extended European Search Report dated Aug. 18, 2011. In corresponding application No. 11163782.3.
Office Action mailed Jul. 26, 2013, in corresponding Canadian patent application No. 2,737,975.

* cited by examiner

*Primary Examiner* — Weilun Lo
*Assistant Examiner* — Rashedul Hassan
(74) *Attorney, Agent, or Firm* — Novak Druce Connolly Bove + Quigg LLP

(57) ABSTRACT

A system and method for displaying a graphical context menu on a display screen of a mobile communication device. The method includes receiving a menu request, determining the number of menu items based on the context of the menu request, generating a graphical context menu based on the determined number of the determined number of menu items, inserting the menu items into the generated graphical context menu, and displaying the generated graphical context menu on the display screen with the inserted menu items. The graphical context menu can include menu items displayed in a 3×3 grid, a 2×3 grid or a 1×3 grid. The graphical context menu can include a default menu item in the center of the grid and a full menu option in the bottom most right slot of the grid.

20 Claims, 29 Drawing Sheets

GRAPHICAL CONTEXT SHORT MENU

CROSS-REFERENCE TO RELATED APPLICATION

This application claims the benefit of U.S. Provisional Application No. 61/327,586, filed on Apr. 23, 2010, the entirety of which is hereby incorporated by reference.

FIELD OF DISCLOSURE

The present disclosure relates generally to a menu for a mobile communication device. More specifically, the present disclosure relates to a graphical context menu for a mobile communication device.

BACKGROUND

With the advent of more robust wireless communications systems, compatible mobile communication devices are becoming more prevalent, as well as advanced. Where in the past such mobile communication devices typically accommodated either voice transmission (cell phones) or text transmission (pagers and PDAs), today's consumer often demands a combination device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Most application programs are menu-driven as opposed to being command-driven. Menu-driven applications provide a list of possible action commands or items from which a user may choose, while command-driven applications require users to enter explicit commands. Thus, menu-driven applications are generally easier for the average user to learn than are command-driven applications. Menus are typically implemented as a list of textual or graphical choices (i.e., menu items) from which a user can choose. Thus, menus allow a user to select a menu item, for example, by pointing to the item with a mouse and then clicking on the item. Examples of other methods of selecting menu items include highlighting an item and then hitting the "return" key or "enter" key, and pressing directly on a menu item through a touch-sensitive screen.

One particularly useful type of menu is a hierarchical menu. Hierarchical menus typically present a parent menu that has selectable menu items. The selection of each menu item normally causes another menu, or submenu, to be displayed next to the currently displayed menu. The submenu has additional menu choices that are related to the selected parent menu item. Also, the parent menu results in the display of the submenu. The depth of a hierarchical menu can extend in this manner to many levels of submenus.

The conventional hierarchical menus generally lay out from left to right across a display screen as menu choices are selected. This menu format provides various advantages such as retaining previous and current menus on the display screen at the same time. This provides a historical menu map as menu selections are made and their corresponding submenus are displayed across the screen. Users can therefore review previous menu selections that have been made while progressing to the most recently displayed menu—thus making it easier to move between different menu items and menu levels.

Although such hierarchical menus provide useful advantages, there are scenarios in which their use is impracticable. One such scenario is when hierarchical menus are used on devices having small display screens. The problems presented when attempting to implement conventional hierarchical menus on small-screen devices have generally discouraged the use of hierarchical menus with such devices.

Hierarchical menus generally lay out across the display screen from left to right. On small-screen devices where the room on the screen is not wide enough to accommodate all of the menus, the menus often lay out across the screen in both directions, from left to right and back again. In this scenario, the menus typically begin to overlap one another, creating various problems. Overlapping menus can be confusing to the user. Overlapping menus can make it difficult for a user to discern previous menu selections which can, in turn, make it difficult to determine how to return to previous menus to make different menu selections. Thus, one of the intended benefits of a hierarchical menu can be undermined when the hierarchical menu is implemented on a small-screen device.

Overlapping menus can also be difficult to work with on small-screen devices (as well as others) that employ pen-based or stylus-based touch-sensitive screens. With such devices, it is often difficult to maintain contact continuity between menus on the screen when the menus are overlapping. In other words, it is easy to move off of menus with small-screen, touch-based devices. If continuity is lost when moving from one menu to another, menus will often disappear from the screen, causing the user to have to go back and reactivate the menu from a prior menu. This problem becomes worse when using pen-based devices that "track". In the present context, the terminology of "tracking" is used to indicate a situation in which a cursor on the screen follows (tracks) the movement of the pen as the pen moves over the screen even though the pen is not touching the screen. Tracking is lost if the pen is pulled too far away from the screen. Thus, pen-based devices that "track" tend to lose more menus when hierarchical menus are employed.

One method of addressing this issue involves displaying submenus in place of a parent menu, and vice versa, when the appropriate menu items are selected from within the parent menus and submenus. Like a typical hierarchical menu, the depth of a hierarchical in-place menu can extend in this manner to many levels of submenus such as second, third, fourth and fifth levels, with submenus being parent menus to other submenus. Parent menu items selected from within parent menus are displayed within submenus as links back to previous parent menus and are separated from that submenu's items by a divider. For example, parent menu item "Launch App" is from a parent menu and thus includes a forward pointer that indicates a submenu will replace the first parent menu upon selection of "Launch App". In each of the submenus, "Launch App" has a backward pointing arrow that facilitates going back to a previous menu in the hierarchy. However, each of the menus provides the full complement of available menu items. This can be overwhelming for a novice user and irritating to an experienced user. This problem is exacerbated to an extent by the addition of a hierarchical history of parent menus added to the list.

Another approach is the use of short menus and full menus. A full or extended menu, lists all available menu items at that particular level and a short menu is a subset of the full menu. The short menu can be a dynamic menu in that a user selects menu items from the corresponding extended menu to be included in the short menu. However, navigating such menus can be difficult when using the navigation tools of a mobile communication device in that a user has to select or highlight the desired menu item when the menu items are in a vertical list.

BRIEF DESCRIPTION OF THE DRAWINGS

Embodiments of the present application will now be described, by way of example only, with reference to the attached Figures, wherein.

DETAILED DESCRIPTION

Figure 1A:
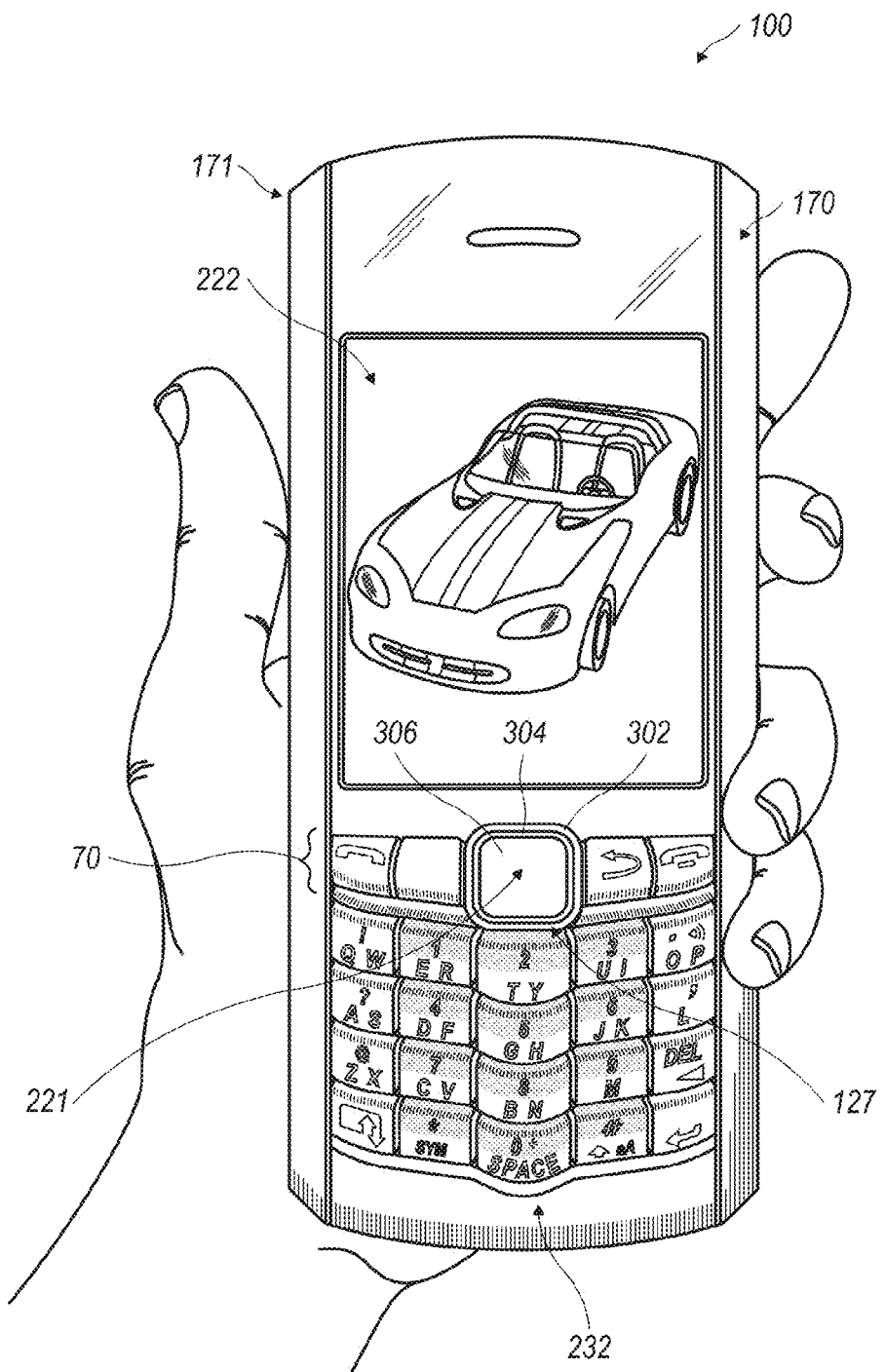
FIG. 1A is a front view of a mobile communication device having a reduced QWERTY keyboard in accordance with an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

Figure 1B:
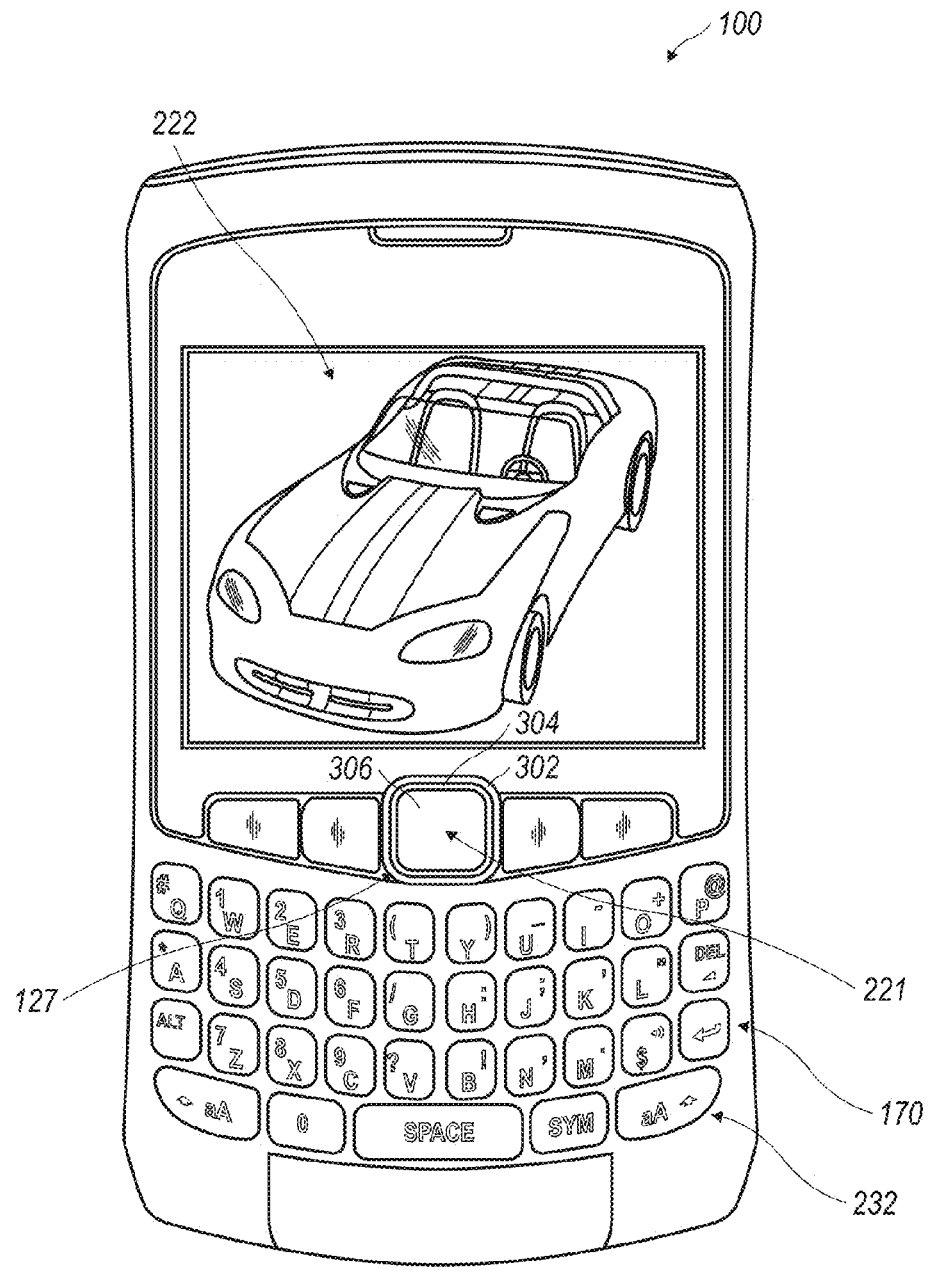
FIG. 1B is a front view of a mobile communication device having a full QWERTY keyboard in accordance with an exemplary embodiment.

Referring to FIGS. 1A and 1B, front views of mobile communication devices 100 having a reduced QWERTY keyboard and a full QWERTY keyboard 232, respectively, with each capable of incorporating a messaging application in accordance with exemplary embodiments are illustrated. Each key of the keyboard 232 can be associated with at least one indicia representing an alphabetic character, a numeral, or a command (such as a space command, return command, or the like). The plurality of the keys having alphabetic characters are arranged in a standard keyboard layout. This standard keyboard layout can be a QWERTY layout (shown in FIGS. 1A and 1B), a QZERTY layout, a QWERTZ layout, an AZERTY layout, a Dvorak layout, a Russian keyboard layout, a Chinese keyboard layout, or other similar layout. These standard layouts are provided by way of example and other similar standard layouts are considered within the scope of this disclosure. The keyboard layout can be based on the geographical region in which the mobile communication device is intended for sale. In some examples, the keyboard can be interchangeable such that the user can switch between layouts.

Figure 2:
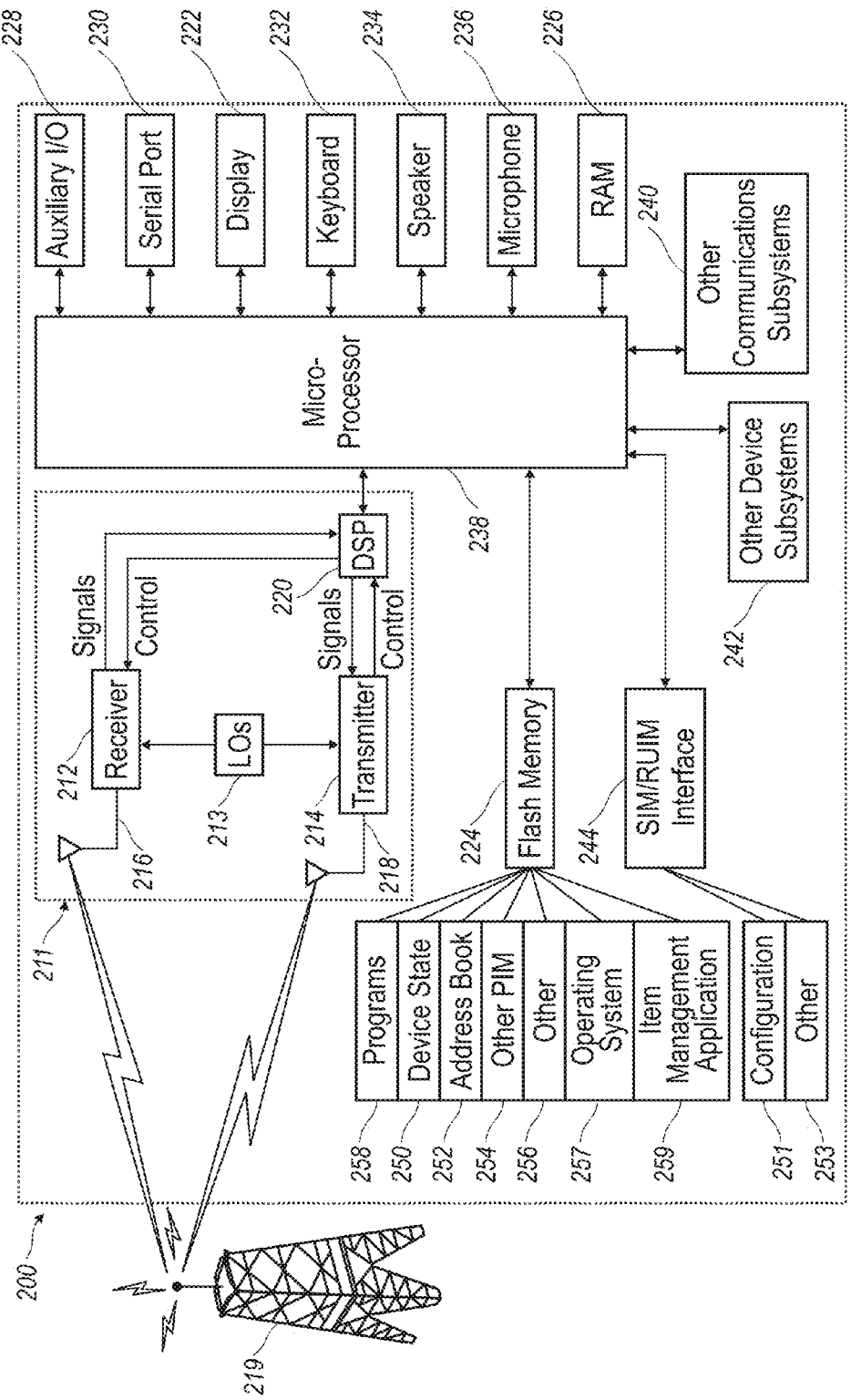
FIG. 2 is a block diagram representing a mobile communication device interacting in a communication network in accordance with an exemplary embodiment.

As shown, the exemplary mobile communication devices 100 are communicatively coupled to a wireless network 219 as exemplified in the block diagram of FIG. 2. These figures are exemplary only, and those persons skilled in the art will appreciate that additional elements and modifications may be necessary to make the mobile communication device 100 work in particular network environments. While in the illustrated embodiments, the mobile communication devices 100 are smart phones, however, in other embodiments, the mobile communication devices 100 may be personal digital assistants (PDA), laptop computers, desktop computers, servers, or other mobile communication device capable of sending and receiving electronic messages.

Referring to FIG. 2, a block diagram of a mobile communication device in accordance with an exemplary embodiment is illustrated. As shown, the mobile communication device 100 includes a microprocessor 238 that controls the operation of the mobile communication device 100. A communication subsystem 211 performs all communication transmission and reception with the wireless network 219. The microprocessor 238 further can be communicatively coupled with an auxiliary input/output (I/O) subsystem 228 which can be communicatively coupled to the mobile communication device 100. Additionally, in at least one embodiment, the microprocessor 238 can be communicatively coupled to a serial port (for example, a Universal Serial Bus port) 230 which can allow for communication with other devices or systems via the serial port 230. A display 222 can be communicatively coupled to microprocessor 238 to allow for displaying of information to an operator of the mobile communication device 100. When the mobile communication device 100 is equipped with the keyboard 232, the keyboard can also be communicatively coupled with the microprocessor 238. The mobile communication device 100 can include a speaker 234, a microphone, 236, random access memory (RAM) 226, and flash memory 224 all of which may be communicatively coupled to the microprocessor 238. Other similar components may be provided on the mobile communication device 100 as well as communicatively coupled to the microprocessor 238. Other communication subsystems 240 and other mobile communication device subsystems 242 are generally indicated as being functionally connected with the microprocessor 238 as well. An example of a communication subsystem 240 is that of a short range communication system such as BLUETOOTH® communication module or a WI-FI® communication module (a communication module in compliance with IEEE 802.11b) and associated circuits and components. Additionally, the microprocessor 238 is able to perform operating system functions and enables execution of programs on the mobile communication device 100. In some embodiments not all of the above components may be included in the mobile communication device 100. For example, in at least one embodiment the keyboard 232 is not provided as a separate component and is instead integrated with a touchscreen as described below. The microprocessor 238 is able to execute a menu program or control program (not shown) for causing the display and control of a graphical context menu. The menu program can be stored in the other communications subsystems 240 or in other locations on the mobile communication device 100.

The auxiliary I/O subsystem 228 can take the form of a variety of different navigation tools 127 (multi-directional or single-directional) such as a trackpad navigation tool 221 as illustrated in the exemplary embodiment shown in FIGS. 1A and 1B, or a trackball, a thumbwheel, an optical trackpad, a navigation pad, a joystick, touch-sensitive interface, or other I/O interface. These navigation tools 127 may be located on a front face or surface 170 of the mobile communication device 100 or may be located on any exterior surface of the mobile communication device 100. Other auxiliary I/O subsystems can include external display devices and externally connected keyboards (not shown). While the above examples have been provided in relation to the auxiliary I/O subsystem 228, other subsystems capable of providing input or receiving output from the mobile communication device 100 are considered within the scope of this disclosure. Additionally, other keys may be placed along the side of the mobile communication device 100 to function as escape keys, volume control keys, scrolling keys, power switches, or user programmable keys, and may likewise be programmed accordingly.

As may be appreciated from FIGS. 1A and 1B, the mobile communication device 100 comprises the lighted display 222 located above the keyboard 232 constituting a user input and suitable for accommodating textual input to the mobile communication device 100. The front face 170 of the mobile communication device 100 has a navigation row 70. As shown, the mobile communication device 100 is of unibody construction, also known as a "candy-bar" design. In alternate embodiments, the mobile communication device 100 can be "clamshell" or a "slider" design.

As described above, the mobile communication device 100 may include the auxiliary input 228 that acts as a cursor navigation tool and which can be also exteriorly located upon the front face 170 of the mobile communication device 100. Its front face location allows the tool to be easily thumb-actuated like the keys of the keyboard 232. An embodiment provides the navigation tool 127 in the form of the trackpad 221, which can be utilized to instruct two-dimensional screen cursor movement in substantially any direction, as well as act as an actuator when the trackpad 221 is depressed like a button. The placement of the navigation tool 127 may be above the keyboard 232 and below the display screen 222; here, it can avoid interference during keyboarding and does not block the operator's view of the display screen 222 during use, e.g., as shown in FIGS. 1A and 1B.

As illustrated in FIGS. 1A and 1B, the mobile communication device 100 may be configured to send and receive messages. The mobile communication device 100 includes a body 171 which may, in some embodiments, be configured to be held in one hand by an operator of the mobile communication device 100 during text entry. The display 222 is included which is located on the front face 170 of the body 171 and upon which information is displayed to the operator during text entry. The mobile communication device 100 may also be configured to send and receive voice communications such as mobile telephone calls. The mobile communication device 100 may also include a camera (not shown) to allow the user to take electronic photographs which can be referred to as photos or pictures.

Furthermore, the mobile communication device 100 is equipped with components to enable operation of various programs, as shown in FIG. 2. In an exemplary embodiment, the flash memory 224 is enabled to provide a storage location for the operating system 257, device programs 258, and data. The operating system 257 is generally configured to manage other programs 258 that are also stored in memory 224 and executable on the processor 238. The operating system 257 honors requests for services made by programs 258 through predefined program 258 interfaces. More specifically, the operating system 257 typically determines the order in which multiple programs 258 are executed on the processor 238 and the execution time allotted for each program 258, manages the sharing of memory 224 among multiple programs 258, handles input and output to and from other device subsystems 242, and so on. In addition, operators can typically interact directly with the operating system 257 through a user interface usually including the keyboard 232 and display screen 222. While in an exemplary embodiment the operating system 257 is stored in flash memory 224, the operating system 257 in other embodiments is stored in read-only memory (ROM) or similar storage element (not shown). As those skilled in the art will appreciate, the operating system 257, device program 258 or parts thereof may be loaded in RAM 226 or other volatile memory.

When the mobile communication device 100 is enabled for two-way communication within the wireless communication network 219, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the mobile communication device 100 may require a unique identifier to enable the mobile communication device 100 to transmit and receive signals from the communication network 219. Other systems may not require such identifying information. GPRS, UMTS, and EDGE use a smart card such as a Subscriber Identity Module (SIM) in order to allow communication with the communication network 219. Likewise, most CDMA systems use a Removable Identity Module (RUIM) in order to communicate with the CDMA network. A smart card can be used in multiple different mobile communication devices 100. The mobile communication device 100 may be able to operate some features without a smart card, but it will not be able to communicate with the network 219. A smart card interface 244 located within the mobile communication device 100 allows for removal or insertion of a smart card (not shown). The smart card features memory and holds key configurations 251, and other information 253 such as identification and subscriber related information. With a properly enabled mobile communication device 100, two-way communication between the mobile communication device 100 and communication network 219 is possible.

If the mobile communication device 100 is enabled as described above or the communication network 219 does not require such enablement, the two-way communication enabled mobile communication device 100 is able to both transmit and receive information from the communication network 219. The transfer of communication can be from the mobile communication device 100 or to the mobile communication device 100. In order to communicate with the communication network 219, the mobile communication device 100 in the presently described exemplary embodiment is equipped with an integral or internal antenna 218 for transmitting signals to the communication network 219. Likewise the mobile communication device 100 in the presently described exemplary embodiment is equipped with another antenna 216 for receiving communication from the communication network 219. These antennae (216, 218) in another exemplary embodiment are combined into a single antenna (not shown). As one skilled in the art would appreciate, the antenna or antennae (216, 218) in another embodiment are externally mounted on the mobile communication device 100.

When equipped for two-way communication, the mobile communication device 100 features the communication subsystem 211. As is understood in the art, this communication subsystem 211 is modified so that it can support the operational needs of the mobile communication device 100. The subsystem 211 includes a transmitter 214 and receiver 212 including the associated antenna or antennae (216, 218) as described above, local oscillators (LOs) 213, and a processing module 220 which in the presently described exemplary embodiment is a digital signal processor (DSP) 220.

It is contemplated that communication by the mobile communication device 100 with the wireless network 219 can be any type of communication that both the wireless network 219 and mobile communication device 100 are enabled to transmit, receive and process. In general, these can be classified as voice and data. Voice communication generally refers to communication in which signals for audible sounds are transmitted by the mobile communication device 100 through the communication network 219. Data generally refers to all other types of communication that the mobile communication device 100 is capable of performing within the constraints of the wireless network 219.

The keyboard 232 can include a plurality of keys that can be of a physical nature such as depressible buttons, or they can be of a software nature, typically constituted by virtual representations of physical keys on the display screen 222 (referred to herein as "virtual keys"). It is also contemplated that the user input can be provided as a combination of the two types of keys. Each key of the plurality of keys has at least one associated action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display screen 222, which in one embodiment is enabled by touching the display screen 222, for example, with a stylus, finger, or other pointer, to generate the character or activate the indicated command or function. Some examples of display screens 222 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular program or feature of the mobile communication device 100 is shown on the display screen 222 in the same configuration as the physical keys. Using this configuration, the operator can select the appropriate physical key corresponding to what is shown on the display screen 222. Thus, the desired character, command or function is obtained by depressing the physical key corresponding to the character, command or function displayed at a corresponding position on the display screen 222, rather than touching the display screen 222.

While the above description generally describes the systems and components associated with a mobile communication device, the mobile communication device 100 could be another mobile communication device such as a PDA, a laptop computer, desktop computer, a server, or other mobile communication device. In those embodiments, different components of the above system might be omitted in order provide the desired mobile communication device 100. Additionally, other components not described above may be required to allow the mobile communication device 100 to function in a desired fashion. The above description provides only general components and additional components may be required to enable the system to function. These systems and components would be appreciated by those of ordinary skill in the art.

Figure 3:
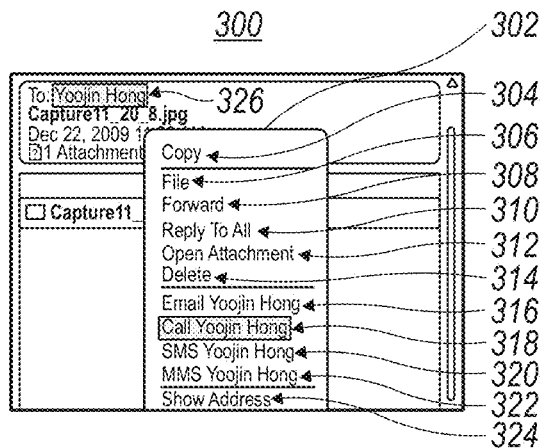
FIG. 3 is a graphical interface of a conventional menu in accordance with an exemplary embodiment.

Referring to FIG. 3, a graphical interface of a conventional context menu in accordance with an exemplary embodiment is illustrated. As shown, a graphical interface 300 having a conventional context menu 302 is displayed in response to a user requesting the menu 302. The conventional context menu 302 can include menu items based on the context that the menu was selected. In this example, the context is an email message with the contact 326 that the email message is addressed to, e.g., "Yoojin Hong" highlighted. The conventional context menu 302 that is displayed provides menu items that are related to the highlighted contact 326. The menu items include: copy 304, file 306, forward 308, replay to all 310, open attachment 312, delete 314, email Yoojin Hong 316, call Yoojin Hong 318, SMS Yoojin Hong 320, MMS Yoojin Hong 322, and show address 324. In order for a user to select a menu item, the user can use a navigational tool 127, e.g., a trackpad 221, to select the desired item, e.g., "Call Yoojin Hong" 318. However, selecting the desired item can be difficult since the area associated with each menu item is limited, e.g., in height.

Figure 4:
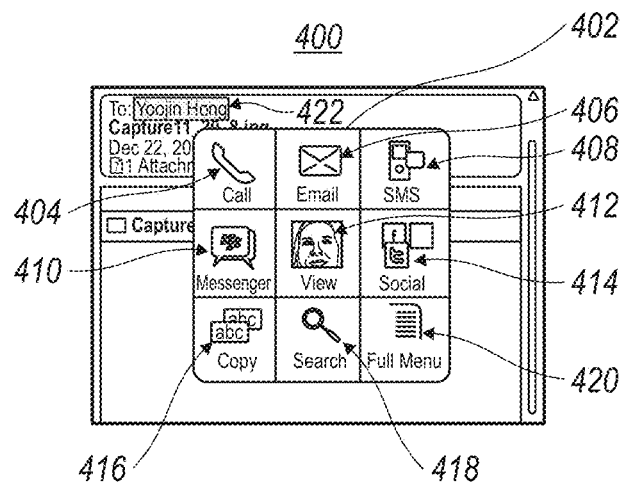
FIG. 4 is a graphical interface of a graphical context menu in accordance with an exemplary embodiment.

Referring to FIG. 4, a graphical interface of a graphical context menu in accordance with an exemplary embodiment is illustrated. As shown, a graphical interface 400 having a graphical context menu 402 can be displayed in response to a user requesting the menu 402. The graphical context menu 402 can include menu items based on the context that the menu was selected. In this example, the context is an email message with the contact 422 that the email message is addressed to, e.g., "Yoojin Hong," highlighted. The menu 402 that is displayed provides menu items that are related to the highlighted contact 422. For example, the user is presented with the following items: call 404 (e.g., call Yoojin Hong), email 406 (e.g., send an email to Yoojin Hong), SMS 408 (e.g., send a text message to Yoojin Hong), messenger 410 (e.g., chat with Yoojin Hong), view 412 (e.g., view information associated with the contact), social network 414 (e.g., communicate with Yoojin Hong using a social network), copy 416 (e.g., copy "Yoojin Hong"), search 418 (e.g., search for "Yoojin Hong"), and more 420 (e.g., display more menu items). The search 418 function can search within the application using the search string. In one or more embodiments, the search 418 function can search through the entire operating systems. For example, if the search 418 function is selected, a search for "Yoojin Hong" can be done in the email system, as well as the SMS, MMS, and BBM applications. As explained in further detail below, the menu 402 can include an icon for Yoojin Hong. As shown, the amount of area to select a menu item is larger compared to the conventional context menu illustrated in FIG. 3.

Figure 5A:
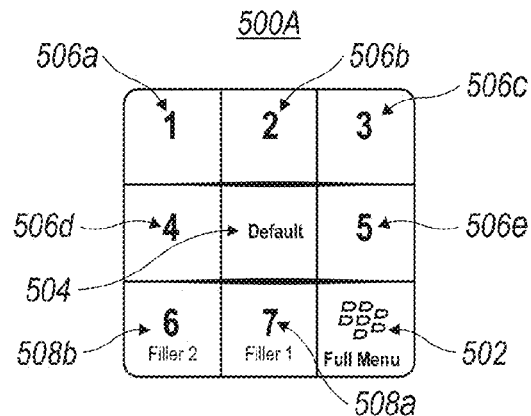
FIG. 5A is a graphical context menu having nine (9) menu items in a three by three grid in accordance with an exemplary embodiment.
Figure 5B:
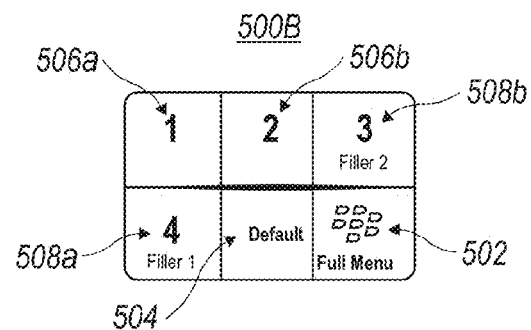
FIG. 5B is a graphical context menu having six (6) menu items in a three by two grid in accordance with an exemplary embodiment.
Figure 5C:
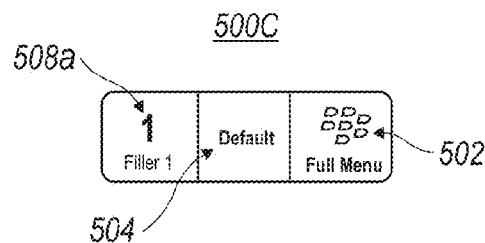
FIG. 5C is a graphical context menu having three (3) menu items in a three by one grid in accordance with an exemplary embodiment.

Referring to FIGS. 5A-5C, graphical context menus showing the layout of the different menus in accordance with exemplary embodiments are illustrated. As shown in FIG. 5A, the graphical context menu 500a can include nine (9) menu items in a three by three grid (e.g., three columns by three rows). Specifically, the exemplary graphical context menu 500a shown can include seven (7) menu items, a default item 504 and a full menu 502. The seven (7) menu items can include five (5) primary items 506a-506e and two (2) filler items 508a, 508b. As shown in FIG. 5B, the graphical context menu 500b can include six (6) menu items in a three by two grid (e.g., three columns by two rows). Specifically, the graphical context menu 500b shown can include four (4) menu items, a default item 504 and a full menu 502. The four (4) menu items can include two (2) primary items 506a, 506b and two filler items 508a, 508b. As shown in FIG. 5C, the graphical context menu 500c can include three (3) menu items in a one by three grid (e.g., one row by three columns). Specifically, the exemplary graphical context menu 500c shown can include a primary menu item 506a or a filler menu item 508a, a default item 504 and a full menu 502. The number of primary menu items 506 and filler menu items 508 can vary according to the number of available menu items as explained in greater detail below.

The graphical context menus 500 can be a popup grid menu having a consistent layout and positioning to leverage muscle memory. The popup grid can have, but is not limited to, a maximum 3×3 grid and can be a 2×3 grid or a 1×3 grid if less menu items are needed. In one or more embodiments, larger or smaller grids can be used, e.g., 4×4, 4×3, 2×2, 3×2 grids. The short graphical context menu 500 can be, but is not limited to, displayed in the center of the display 222. All cell sizes can be, but are not limited to, identical. In one or more embodiments, the default menu item in the center cell can be larger than the other cells with all of the other cells having the identical size. Approximate cell sizes can be, but are not limited to, 75×75 to 85×85 mms. Each cell of the grid, can be, but is not limited to, including an icon and text. The text can be limited to two lines with " . . . " to replace additional wording. The icons in the short graphical context menu 500 can be the same or similar to the icons used in toolbars. The graphical context menus 500 can have the same style, e.g., border, dividers, and colors, and can be displayed over the currently displayed screen from which the menu request was generated. Each menu item can be substantially square which can be easier for a user to click on in a touchscreen as the shape of the menu item fits more easily with the shape of a finger. Similarly, the shape can also make it easier for a user to click on the menu item with a navigation tool 127. Due to the convenience of the shape, the user can correctly select the correct menu item. By using the graphical icons associated with each menu item can allow a user to quickly identify the menu item the user wants without having to read through the entire listing compared to a conventional menu list.

The default menu item 504 can be in the center of each menu 500 (for the three by two grid, the default item can be in the middle of the lower row) and a full menu item 502 can be in the bottom right most slot of graphical context menu 500. In one or more embodiments, the default menu item, the full menu item, or both, can be inserted into different slots in the graphical context menu 500. In one or more embodiments, the default menu item 504 can be highlighted when displayed. By including the full menu item 502 in each menu 500, there are no dead ends in the menus 500 because there is a provided means to access a full menu. By using the graphical context menus 500, a user can use the navigational tool 127 to select a desired menu item. The grid format can be visually appealing and can allow for easier navigation since the selectable area for a menu item is larger compared to a conventional list menu comprising text only with a limited height access area. In one or more embodiments, the layout of the menu can also take different forms, e.g., circular, default item is a different location such as the top left corner, or with the full menu item in the center.

The graphical context menu 500 can be a dynamic menu that includes menu items from a full or extended menu. In other words, the graphical context menu 500 can include menu items that are a subset of a full or extended menu. A full or extended menu can list all available menu items at that particular level and can be accessed by selecting the full menu item 502. The full or extended menu can be graphical or non-graphical. In one or more embodiments, the full menu item 502 can be replaced with another icon, e.g., more menu item icon. In such an embodiment, when the more menu item icon is selected, another graphical context menu 500 with one or more different menu items can be displayed. This graphical context menu 500 can include a more menu item icon which can lead to another graphical context menu 500.

A menu program can generate and display the graphical context menus 500. The menu program can be a standalone program, can be incorporated into an application run on the mobile communication device 100, e.g., by the microprocessor 238, or both. The menu program can be stored in the device program 258 on the mobile communication device 100. For older applications, e.g., applications that do not incorporate the menu program or equivalent, the application can generate menus, e.g., vertical list menus, and the menu program can replace the generated menus with graphical context menus. As a result, the old menu is automatically replace with a graphical context menu. In generating the graphical context menu, the separators and system menu items are ignored. If there are too many menu items provided, the rest can be ignored. In addition, the menu items can be converted in order of importance, which can be derived from the ordinal value. Menu items can be stored on the mobile communication devices. Appendix A, attached to this document and incorporated in its entirety, provides exemplary list of menu options for the graphical context menus for various contexts. The lists can be defined by the programmer. In one or more embodiments, the lists can be revised based on user's selections, e.g., the menu items are listed based on popularity (e.g., based on selections by the user).

The graphical context menus 500 can be generated and displayed in response to menu requests. Menu requests can be generated in response to entries on a navigation tool 127, such as click on a trackpad, a touch tap, a click-press, or a press-hold, as well as the pressing of a menu key or the user selecting a menu item in an application. The menu items can also be selected using a double click action, e.g., clicking on a menu item once to highlight and again to select it. In one or more embodiments, the default menu item 504 can be highlighted when the graphical context menu 500 is displayed. In such embodiments, the default menu item 504 can require only one click. As discussed below, the menu items can be selected using one or more selection means.

Figure 36:
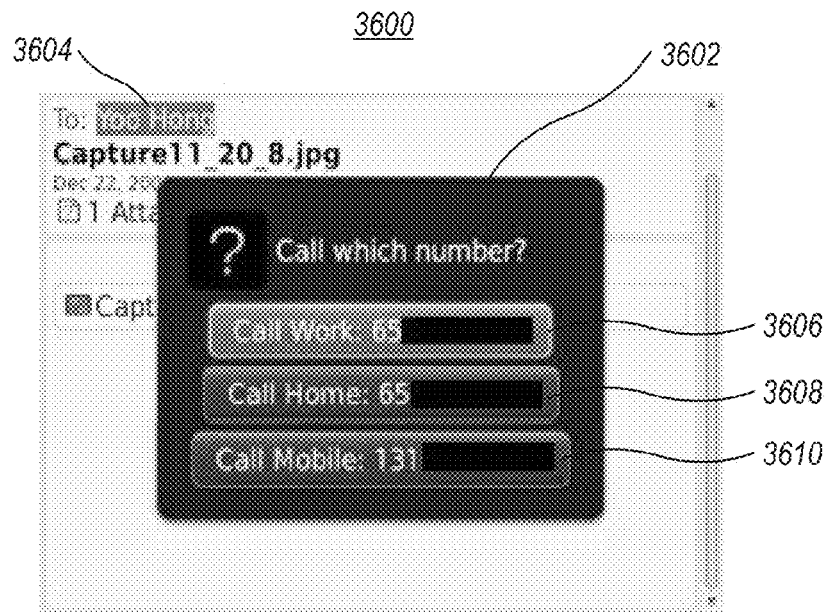
FIG. 36 is a graphical interface having a pop-up menu in accordance with an exemplary embodiment.

In one or more embodiments, where a selected menu item is ambiguous, e.g., more than one option is available, another menu can be displayed. For example, if the call item 404 in the graphical context menu 400 displayed in FIG. 4 is selected and there are multiple numbers associated with the contact, then another popup menu 3602 can be displayed as shown in FIG. 36. As shown, the graphical interface 3600 includes an email message addressed to a contact 3604, e.g., Yoojin Hong, who has three different contact numbers: work, home and mobile phone numbers (numbers are blocked out). The popup menu 3602 can include menu options for calling the contact: call work 3606, call home 3608 and call mobile 3610.

In one or more embodiments, the user can revise a list of menu items associated with the context of a menu request. For example, the user can access the list via the setting application. The user can re-prioritize the list, add one or more menu items (with or without an icon, with or without text), or remove one or more menu items.

Figure 6:
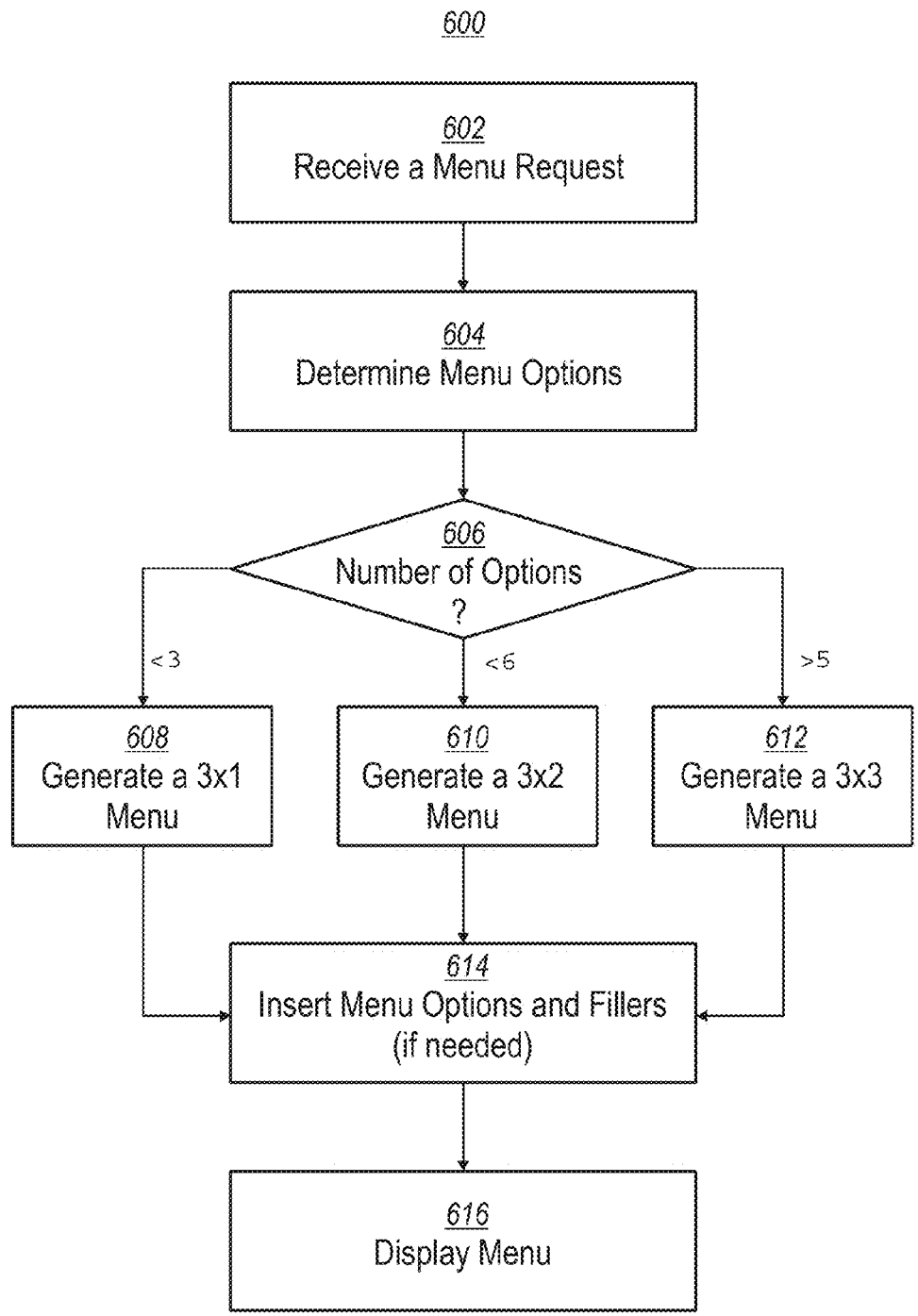
FIG. 6 is a flowchart of a method for generating and displaying a graphical context menu in accordance with an exemplary embodiment.

Referring to FIG. 6, a flowchart showing a method for generating and displaying a graphical context menu in accordance with an exemplary embodiment is illustrated. The exemplary method 600 is provided by way of example, as there are a variety of ways to carry out the method. In one or more embodiments, the method 600 is performed by the menu program. The method 600 can be executed or otherwise performed by one or a combination of various systems. The method 600 described below can be carried out using the mobile communication devices 100 and communication network shown in FIGS. 1A, 1B, and 2 by way of example, and various elements of these figures are referenced in explaining exemplary method 600. Each block shown in FIG. 600 represents one or more processes, methods or subroutines carried out in exemplary method 600. The exemplary method 600 can begin at block 602.

At block 602, a menu request can be received. For example, the microprocessor 238 or menu program can receive the menu request. Menu requests can be generated in response to a navigational tool entry, such as a trackpad click, a touch tap, click-press, press and hold, pressing of a menu key. The context of the menu request is determined. The context of the menu request can include the application, the displayed screen, the focus of the request (e.g., where the cursor or focus of the navigation tool is located, such as on a contact name or on a blank space on the screen. After receiving the menu request, the method 600 can proceed to block 604.

At block 604, the number of menu options can be determined based on the context of the menu request. The number of menu options is determined based on a list associated with the context of the menu request. For example, the menu program or the microprocessor 238 can access the lists in Appendix A and identify the specific list based on the context. After obtaining the list, the menu program or microprocessor 238 can eliminate menu items that are not applicable or disabled. For example, if the identified list includes a menu item to call a contact, but the contact does not have an associated telephone number, then the call item is removed from the list. The elimination of the menu item is for that particular displayed graphical context menu 500. In other words, if another menu request is received and the identified list includes a menu item to call a contact and there is an associated number with the contact then that menu item is not eliminated for that graphical context menu. Depending on the number of menu options, the method 600 can proceed to block 608, 610, or 612.

In the event the number of menu items is less than three (3), then at block 608, a graphical context menu can be generated having three (3) columns and one (1) row. In the event the number of menu items is less than six (6), then at block 610, a graphical context menu can be generated having three (3) columns and two (2) rows. In the event the number of menu items is greater than five (5) then at block 612, a graphical context menu can be generated having three (3) columns and three (3) rows. The microprocessor 238 or menu program can generate each graphical context menu. After generating the graphical context menu, the method 600 proceeds to block 614.

At block 614, the menu items and fillers, if needed, can be inserted into the graphical context menu. For example, the microprocessor 238 or menu program can insert a default item can be inserted into the center of the grid and a full menu item can be inserted into the bottom right most grid position. The items can be filled into the graphical context menu in accordance with their place in the listing. For example, the top item can be the default item, the next item can go into the number one (1) slot, the next item can go into the number two (2) slot, etc. If the number of items to be filled into a grid is less than the number of available slots in the grid, the menu program or microprocessor 238 can insert filler items. Typically, the number of filler items can be limited to one (1) item for the 1×3 grid, two (2) items for the 2×3 grid and a maximum of four (4) items for the 3×3 grid. The filler items can be context specific, e.g., copy, search, or help, or can be cross application items, e.g., switch applications. After inserting menu options and fillers (if needed) into the graphical context menu, the method 600 proceeds to block 616.

At block 616, the graphical context menu is displayed. For example, the microprocessor 238 or menu program can display the generated graphical context menu on the display screen 222 of the mobile communication device.

Figure 7:
FIG. 7 is a graphical interface having a graphical context menu for a homescreen with the email application highlighted in accordance with an exemplary embodiment.

Referring to FIG. 7, a graphical interface 700 having a graphical context menu 702 for a homescreen with the email application 724 highlighted in accordance with an exemplary embodiment is illustrated. As shown, the graphical context menu 702 is automatically configured as a 2×3 (2 rows by 3 columns) grid with the default item 714 being the launch menu item. The other menu items include move 706, move to folder 708, mark as favorite 710, hide 712, and full menu 716.

Figure 8:
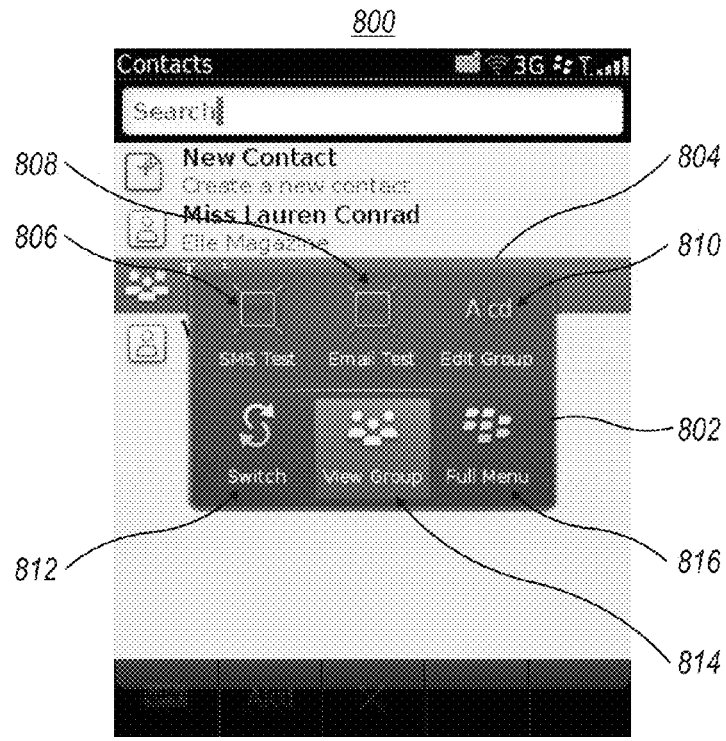
FIG. 8 is a graphical interface having a graphical context menu for the contacts application with a group contact (e.g., the "Test" group") highlighted in accordance with an exemplary embodiment.

Referring to FIG. 8, a graphical interface 800 having a graphical context menu 802 for the contacts application with a group contact 804 (e.g., the "Test" group") highlighted in accordance with an exemplary embodiment is illustrated. As shown, the graphical context menu 802 is automatically configured as a 2×3 grid with the default item 814 being the view group menu item. The other menu items include SMS test 806, email test 808, edit group 810, switch 812, and full menu 816.

Figure 9:
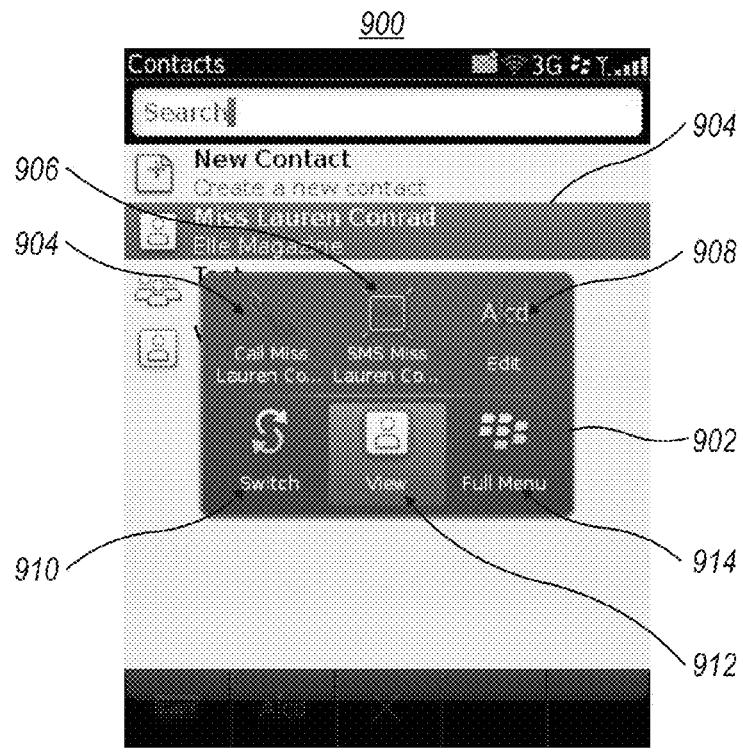
FIG. 9 is a graphical interface having a graphical context menu for the contacts application with an individual contact (e.g., Miss Lauren Conrad) highlighted in accordance with an exemplary embodiment.

Referring to FIG. 9, a graphical interface 900 having a graphical context menu 902 for the contacts application with an individual contact 904 (e.g., Miss Lauren Conrad) highlighted in accordance with an exemplary embodiment is illustrated. As shown, the graphical context menu 902 is automatically configured as a 2×3 grid with the default item 912 being the view menu item. The other menu items include call the contact (e.g., Miss Lauren Conrad) 904, SMS the contact (e.g., Miss Lauren Conrad) 906, edit 908, switch 910, and full menu 914.

Figure 10:
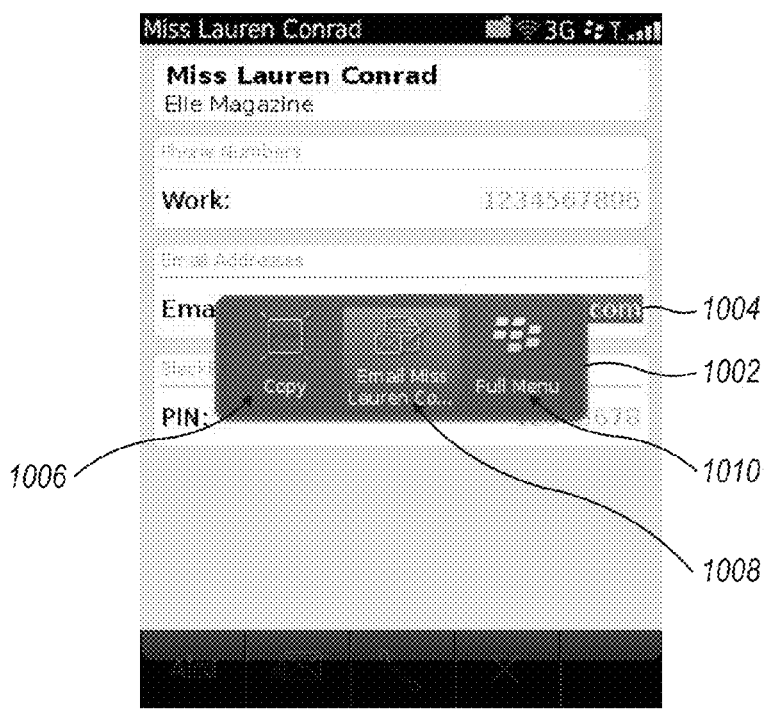
FIG. 10 is a graphical interface having a graphical context menu for a contact application with the email address for an individual contact highlighted in accordance with an exemplary embodiment.

Referring to FIG. 10, a graphical interface 1000 having a graphical context menu 1002 for a contact application with the email address for an individual contact 1004 highlighted in accordance with an exemplary embodiment is illustrated. As shown, the graphical context menu 1002 is automatically configured as a 1×3 grid with the default item 1008 being the email the contact (e.g., Miss Lauren Conrad) menu item, along with the copy menu item 1006, and full menu 1010.

Figure 11:
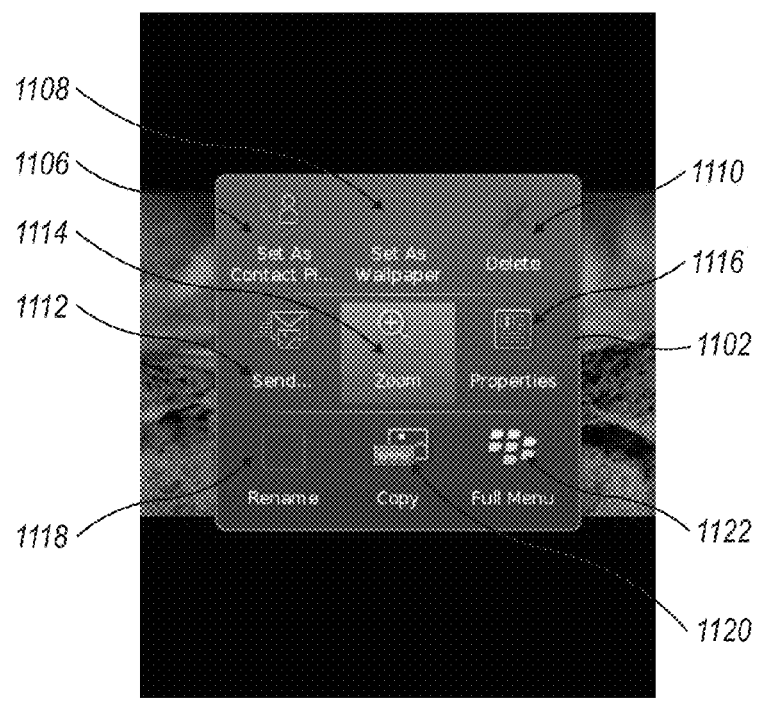
FIG. 11 is a graphical interface having a graphical context menu for a photograph 1104 in a photograph application in accordance with an exemplary embodiment.

Referring to FIG. 11, a graphical interface 1100 having a graphical context menu 1102 for a photograph in a photograph application in accordance with an exemplary embodiment is illustrated. As shown, the graphical context menu 1102 is automatically configured as a 3×3 grid with the default item 1114 being the zoom menu item. The other menu items include set as contact picture 1106, set as wallpaper 1108, delete 1110, send 1112, properties 1116, rename 1118, copy 1120, and full menu item 1122.

Figure 12:
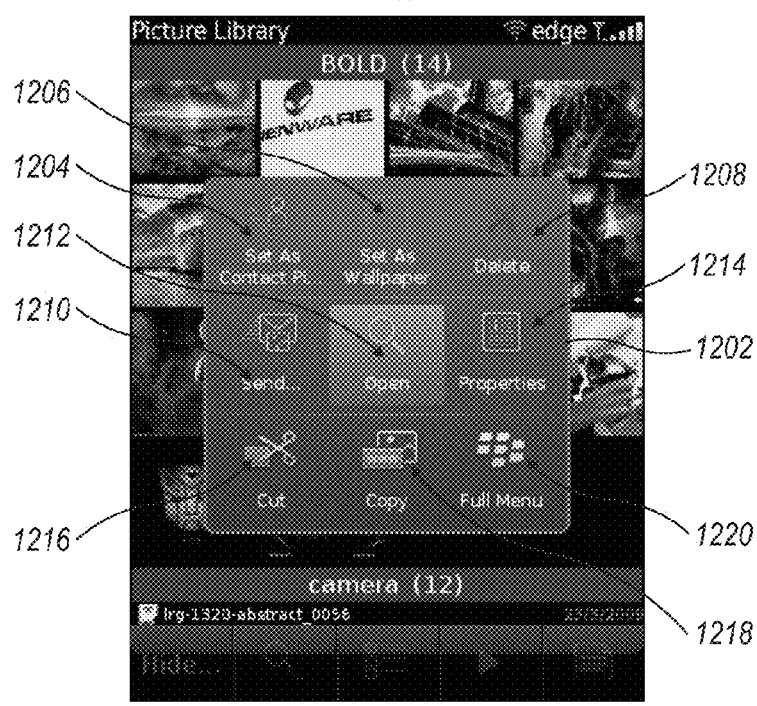
FIG. 12 is a graphical interface having a graphical context menu for a picture library for a picture application with a single photograph highlighted (not shown due to the graphical context menu being displayed) in accordance with an exemplary embodiment.

Referring to FIG. 12, a graphical interface 1200 having a graphical context menu 1202 for a picture library for a picture application with a single photograph highlighted (not shown due to the graphical context menu 1202 being displayed) in accordance with an exemplary embodiment is illustrated. As shown, the graphical context menu 1202 is automatically configured as a 3×3 grid with the default item 1212 being the open menu item. The other menu items include set as contact picture 1204, set as wallpaper 1206, delete 1208, send 1210, properties 1214, cut 1216, copy 1218, and full menu item 1220. Comparing the graphical interface 1100 of FIG. 11 with the graphical interface 1200 of FIG. 12, the menu items are different in that the graphical interface 1100 of FIG. 11 is for a single photo and the graphical interface 1200 of Figure is for a library of photographs.

Figure 13:
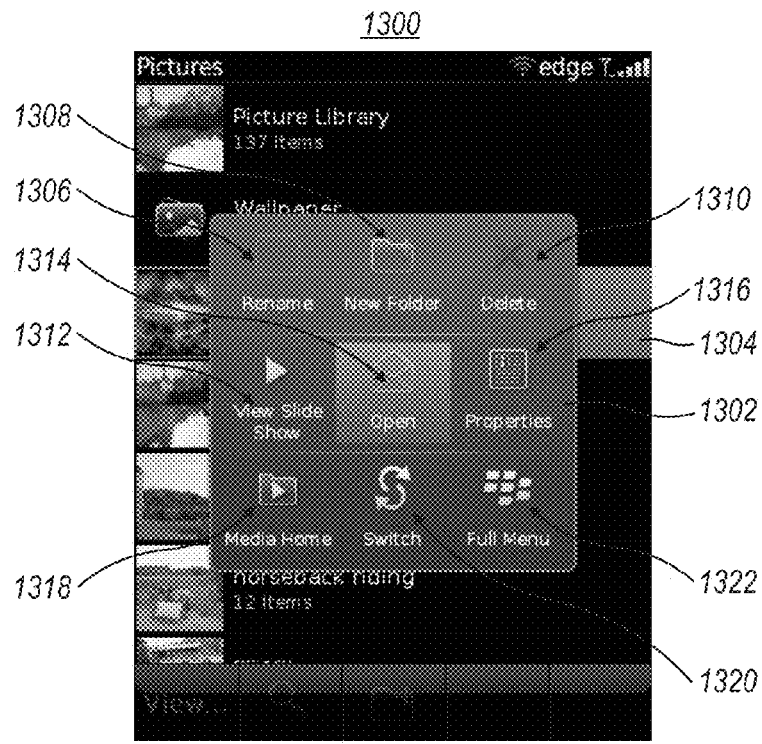
FIG. 13 is a graphical interface having a graphical context menu for a pictures application with a library highlighted in accordance with an exemplary embodiment.

Referring to FIG. 13, a graphical interface 1300 having a graphical context menu 1302 for a pictures application with a library 1304 highlighted in accordance with an exemplary embodiment is illustrated. As shown, the graphical context menu 1302 is automatically configured as a 3×3 grid with the default item 1314 being the open menu item. The other menu items include rename 1306, new folder 1308, delete 1310, view slide show 1312, properties 1316, media home 1318, switch 1320, and full menu item 1322.

Figure 14:
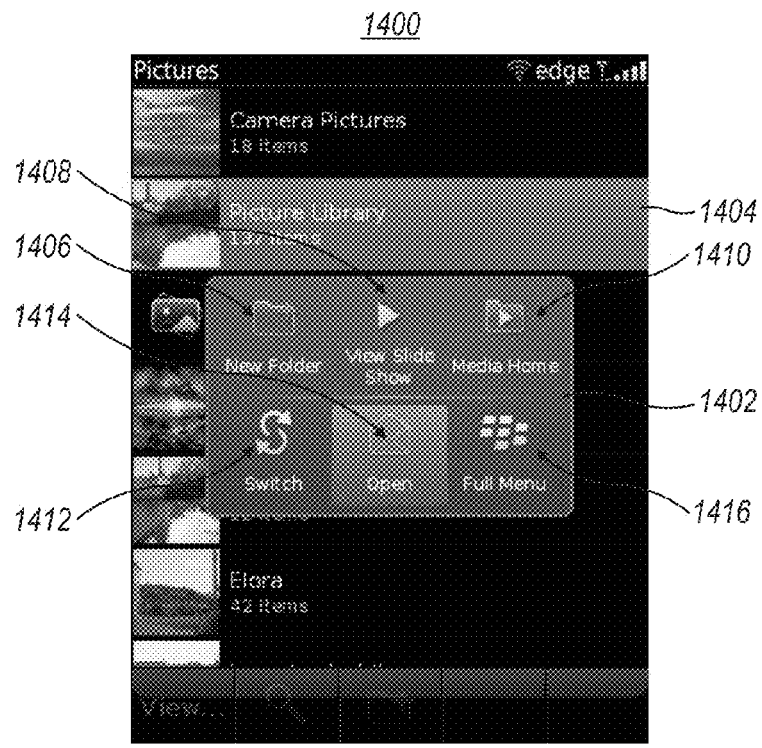
FIG. 14 is a graphical interface having a graphical context menu for a picture library for a pictures application with a library highlighted in accordance with an exemplary embodiment.

Referring to FIG. 14, a graphical interface 1400 having a graphical context menu 1402 for a picture library for a pictures application with a library 1404 highlighted in accordance with an exemplary embodiment is illustrated. As shown, the graphical context menu 1402 is automatically configured as a 2×3 grid with the default item 1414 being the open menu item. The other menu items include new folder 1406, view slide show 1408, media home 1410, switch 1412, and full menu item 1416.

Figure 15:
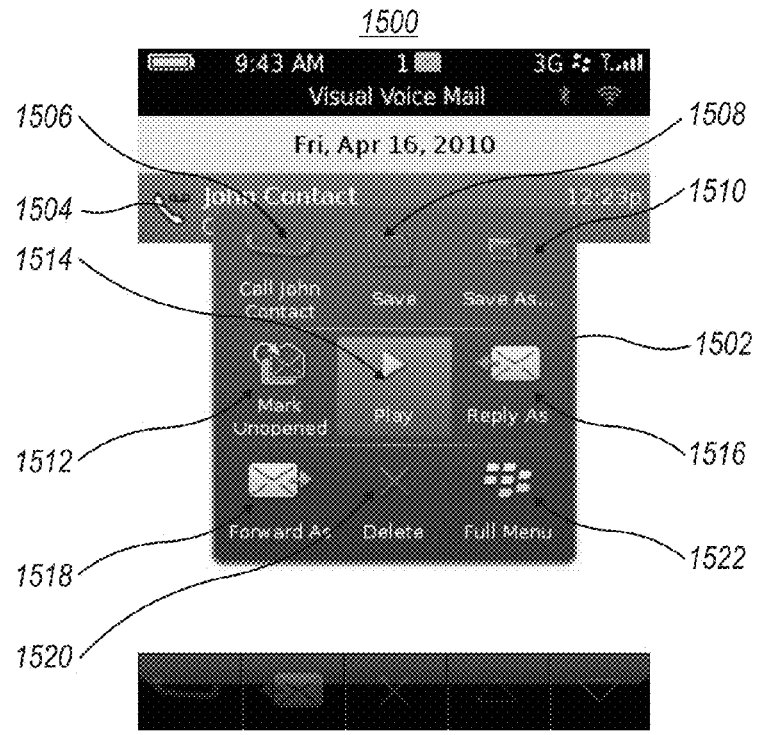
FIG. 15 is a graphical interface having a graphical context menu for a visual voice message application with a voicemail highlighted in accordance with an exemplary embodiment.

Referring to FIG. 15, a graphical interface 1500 having a graphical context menu 1502 for a visual voice message application with a voicemail 1504, e.g., John Contact, highlighted in accordance with an exemplary embodiment is illustrated. As shown, the graphical context menu 1502 is automatically configured as a 3×3 grid with the default item 1514 being the play menu item. The other menu items include call John Contact 1506, save 1508, save as 1510, mark opened 1512, reply as 1516, forward as email 1518, delete 1520, and full menu item 1522.

Figure 16:
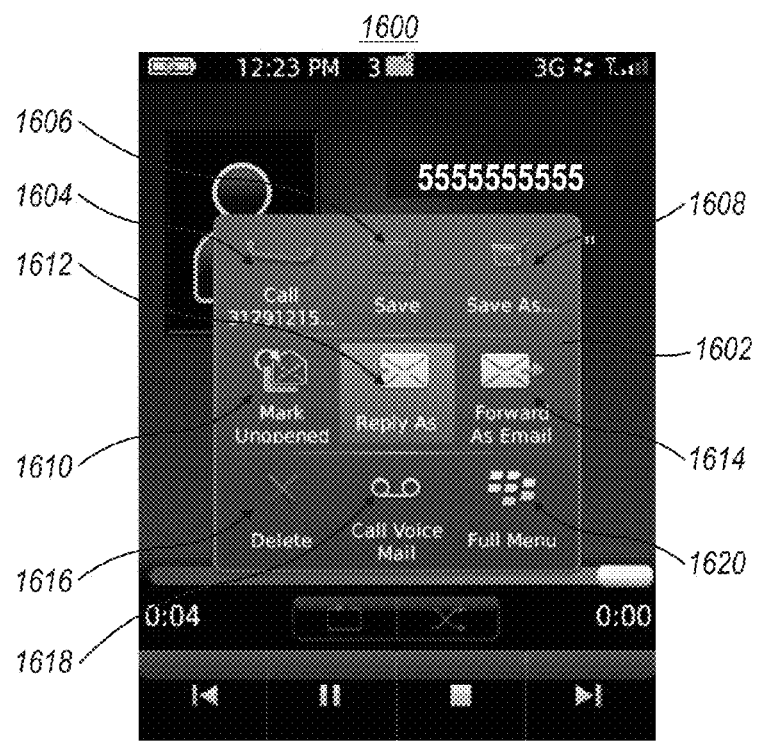
FIG. 16 is a graphical interface having a graphical context menu for a voice message application after the message is played in accordance with an exemplary embodiment.

Referring to FIG. 16, a graphical interface 1600 having a graphical context menu 1602 for a voice message application after the message, e.g., from telephone number 31291215 . . . , is played in accordance with an exemplary embodiment is illustrated. As shown, the graphical context menu 1602 is automatically configured as a 3×3 grid with the default item 1612 being the reply as menu item. The other menu items include call 31291215 . . . 1604, save 1606, save as 1608, mark unopened 1610, forward as email 1614, delete 1616, call voice mail 1618, and full menu item 1620.

Figure 17:
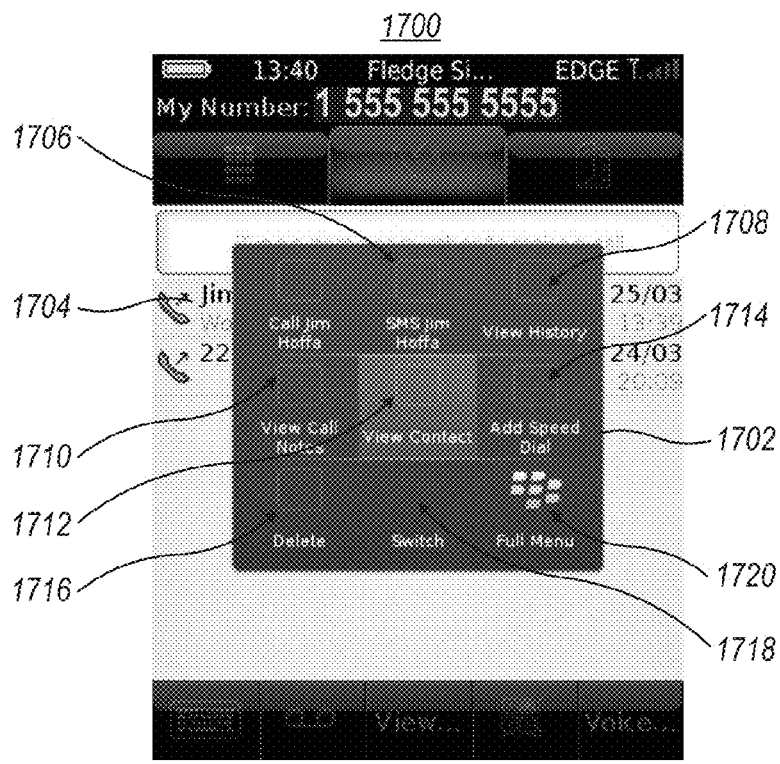
FIG. 17 is a graphical interface having a graphical context menu for a telephone application having an idle call screen with a known contact (e.g., Jim Hoffa) in accordance with an exemplary embodiment.

Referring to FIG. 17, a graphical interface 1700 having a graphical context menu 1702 for a telephone application having an idle call screen with a known contact (e.g., Jim Hoffa) in accordance with an exemplary embodiment is illustrated. As shown, the graphical context menu 1702 is automatically configured as a 3×3 grid with the default item 1712 being the view contact (e.g., Jim Hoffa) menu item. The other menu items include call Jim Hoffa (e.g., contact) 1704, SMS Jim Hoffa (e.g., contact) 1706, view history 1708, view call notes 1710, add speed dial 1714, delete 1716, switch 1718, and full menu item 1720.

Figure 18:
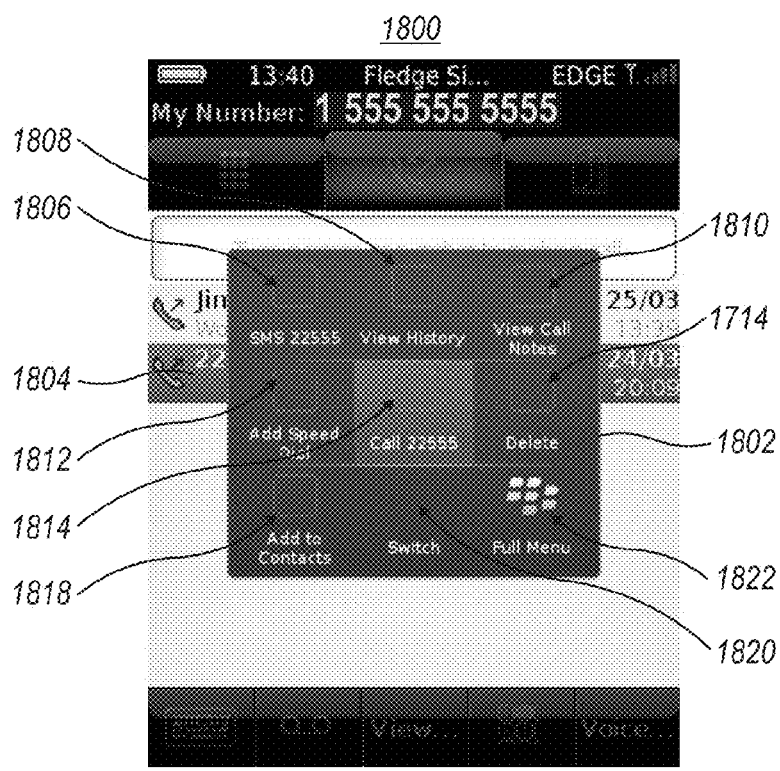
FIG. 18 is a graphical interface having a graphical context menu for a telephone application with an idle call screen with an unknown contact in accordance with an exemplary embodiment.

Referring to FIG. 18, a graphical interface 1800 having a graphical context menu 1802 for a telephone application with an idle call screen with an unknown contact 1804 in accordance with an exemplary embodiment is illustrated. As shown, the graphical context menu is automatically configured as a 3×3 grid with the default item 1814 being call 22555 (e.g., number) menu item. The other menu items include SMS 22555 (e.g., number) 1806, view history 1808, view call notes 1810, add speed dial 1812, delete 1816, add to contacts 1818, switch 1820, and full menu item 1822.

Figure 19:
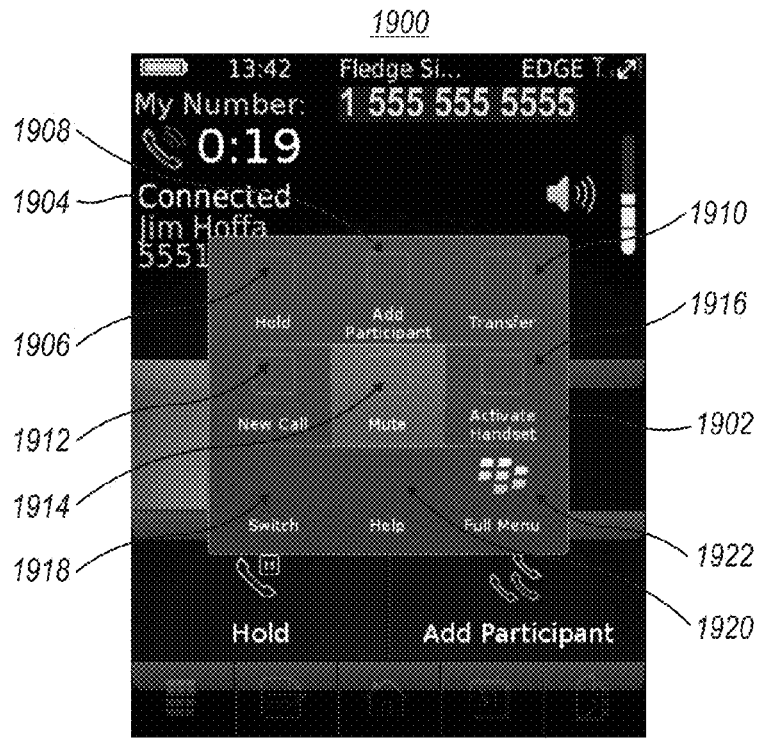
FIG. 19 is a graphical interface having a graphical context menu for a telephone application with an ongoing single call in accordance with an exemplary embodiment.

Referring to FIG. 19, a graphical interface 1900 having a graphical context menu 1902 for a telephone application with an ongoing single call 1904 in accordance with an exemplary embodiment is illustrated. As shown, the graphical context menu 1902 is automatically configured as a 3×3 grid with the default item 1914 being the mute menu item. The other menu items include hold 1906, add participant 1908, transfer 1910, new call 1912, activate handset 1916, switch 1918, help 1920, and full menu item 1922.

Figure 20:
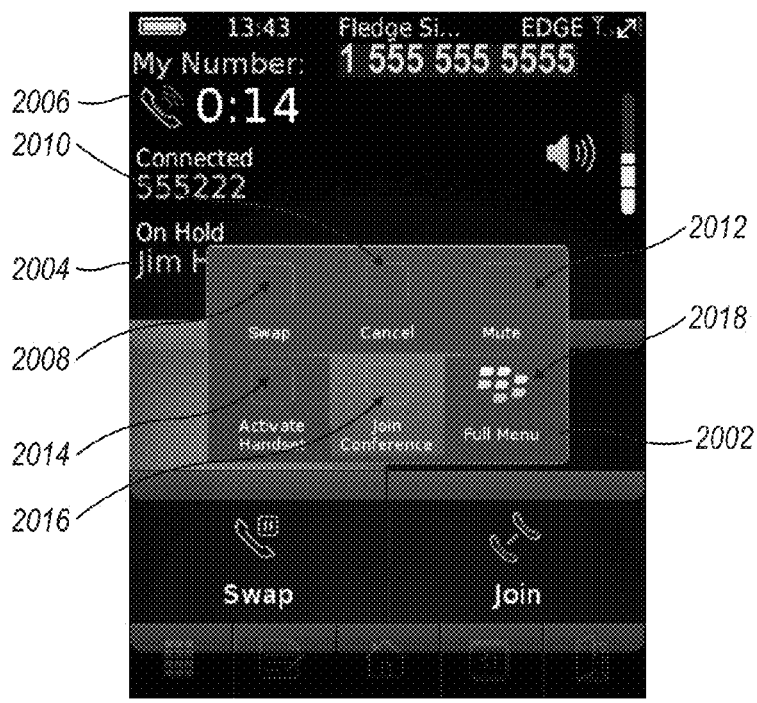
FIG. 20 is a graphical interface having a graphical context menu for a telephone application with one call on hold (e.g., Jim Hoffa) and another active call (e.g., 555222) in accordance with an exemplary embodiment.

Referring to FIG. 20, a graphical interface 2000 having a graphical context menu 2002 for a telephone application with one call on hold (e.g., Jim Hoffa) 2004 and another active call (e.g., 555222) 2006 in accordance with an exemplary embodiment is illustrated. As shown, the graphical context menu 2002 is automatically configured as a 2×3 grid with the default item 2016 being the join conference menu item. The other menu items include swap 2008, cancel 2010, mute 2012, activate handset 2014, and full menu item 2018.

Figure 21:
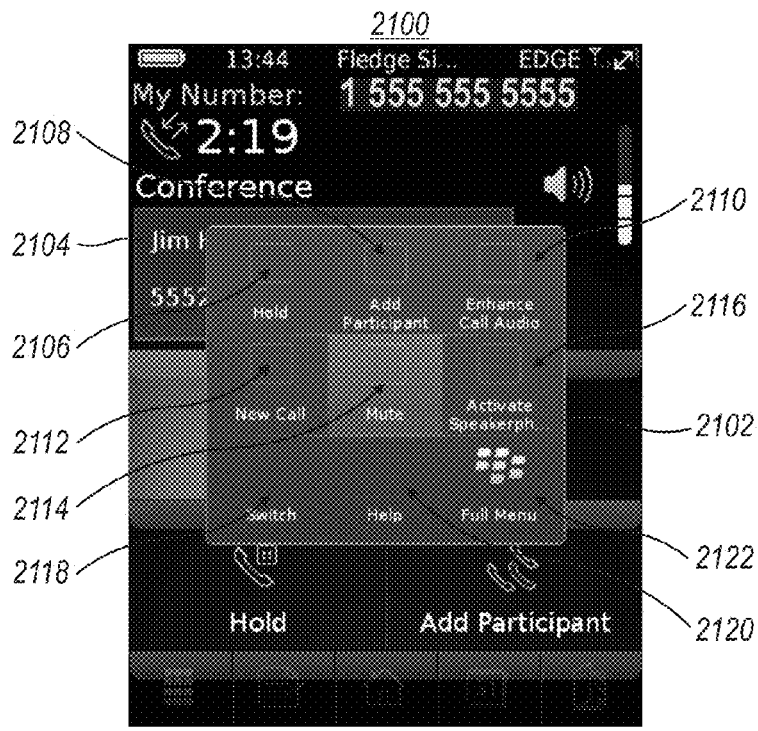
FIG. 21 is a graphical interface having a graphical context menu for a telephone application with an ongoing conference call and the focus on a button (not shown, but highlighted) in accordance with an exemplary embodiment.

Referring to FIG. 21, a graphical interface 2100 having a graphical context menu 2102 for a telephone application with an ongoing conference call 2104 and the focus on a button (not shown, but highlighted) in accordance with an exemplary embodiment is illustrated. As shown, the graphical context menu 2102 is automatically configured as a 3×3 grid with the default item 2114 being the mute menu item. The other menu items include hold 2106, add participant 2108, enhance call audio 2110, new call 2112, activate speakerphone 2116, switch 2118, help 2120, and full menu item 2122.

Figure 22:
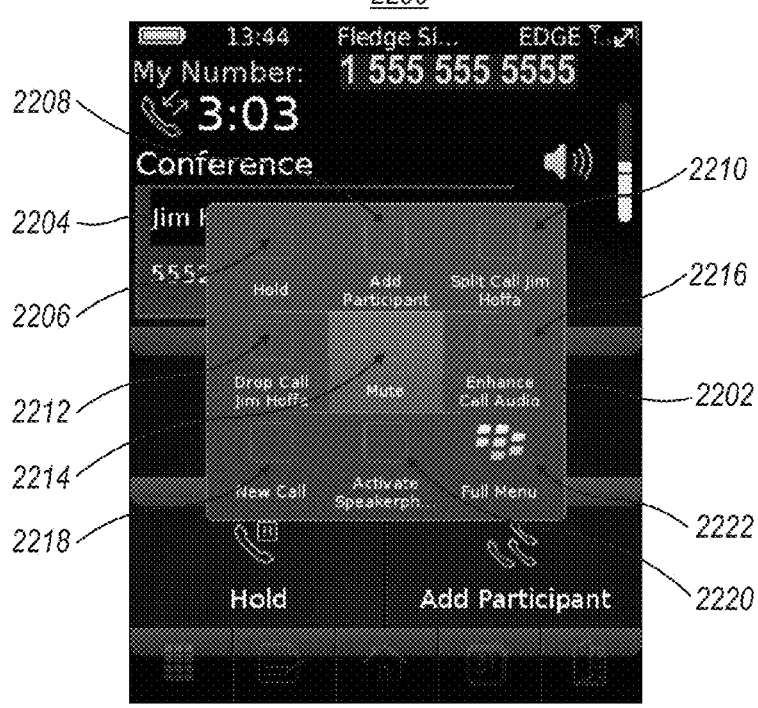
FIG. 22 is a graphical interface having a graphical context menu for a telephone application with an ongoing conference call and the focus on conference call member in accordance with an exemplary embodiment.

Referring to FIG. 22, a graphical interface 2200 having a graphical context menu 2202 for a telephone application with an ongoing conference call and the focus on conference call member 2204 in accordance with an exemplary embodiment is illustrated. As shown, the graphical context menu 2202 is a 3×3 grid with the default item 2214 being the mute menu item. The other menu items include hold 2206, add participant 2208, split call Jim Hoffa (e.g., contact) 2210, drop call Jim Hoffa (e.g., contact) 2212, enhance call audio 2216, new call 2218, activate speakerphone 2220, and full menu item 2222.

Figure 23:
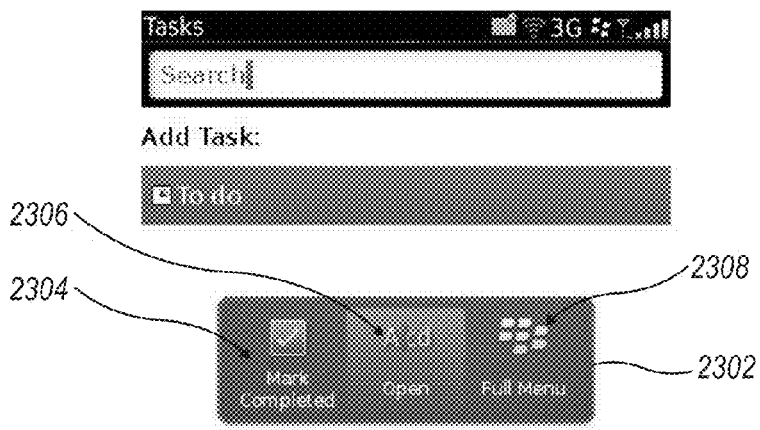
FIG. 23 is a graphical interface having a graphical context menu for a task application in accordance with an exemplary embodiment.

Referring to FIG. 23, a graphical interface 2300 having a graphical context menu 2302 for a task application in accordance with an exemplary embodiment is illustrated. As shown, the graphical context menu 2302 is automatically configured as a 1×3 grid with the default item 2306 being the open menu item, along with the mark completed menu item 2304 and full menu item 2308.

Figure 24:
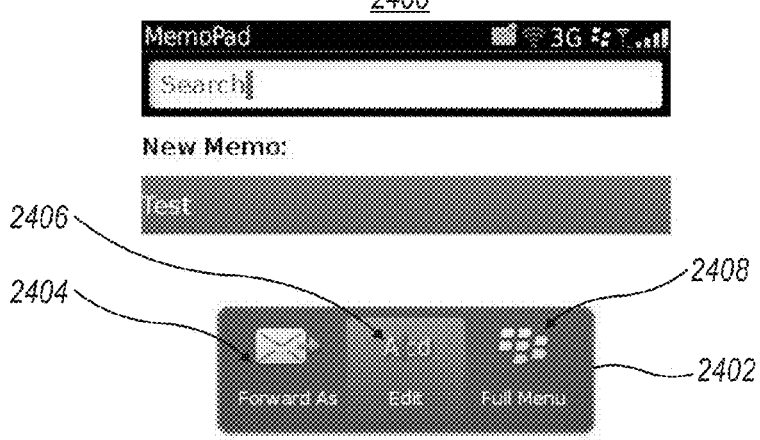
FIG. 24 is a graphical interface having a graphical context menu for a memo pad application in accordance with an exemplary embodiment.

Referring to FIG. 24, a graphical interface 2400 having a graphical context menu 2402 for a memo pad application in accordance with an exemplary embodiment is illustrated. As shown, the graphical context menu 2402 is automatically configured as a 1×3 grid with the default item 2406 being the edit menu item, along with the forward as menu item 2404 and full menu item 2408.

Figure 25:
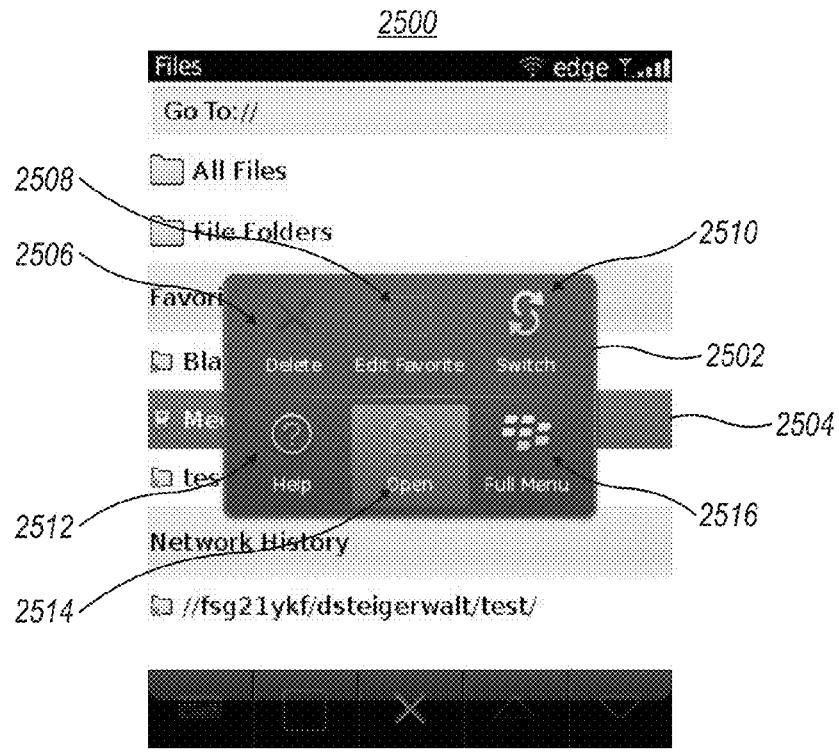
FIG. 25 is a screenshot having a graphical context menu for a web browser application with a website highlighted in accordance with an exemplary embodiment.

Referring to FIG. 25, a graphical interface 2500 having a graphical context menu 2502 for a file application with a website 2504 highlighted in accordance with an exemplary embodiment is illustrated. As shown, the graphical context menu 2502 is automatically configured as a 2×3 grid with the default item 2514 being the open menu item. The other menu items include delete 2506, edit favorite 2508, switch 2510, help 2512, and full menu item 2516.

Figure 26:
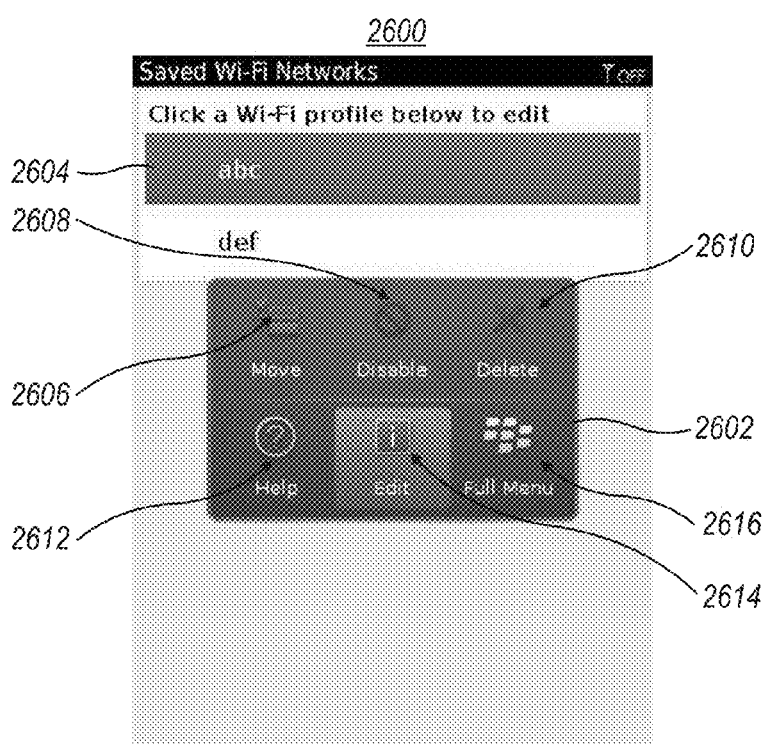
FIG. 26 is a graphical interface having a graphical context menu for a Wi-Fi application with a Wi-Fi profile highlighted in accordance with an exemplary embodiment.

Referring to FIG. 26, a graphical interface 2600 having a graphical context menu 2602 for a Wi-Fi application with a Wi-Fi profile 2604 highlighted in accordance with an exemplary embodiment is illustrated. As shown, the graphical context menu 2602 is automatically configured as a 2×3 grid with the default item 2614 being the edit menu item. The other menu items include move 2606, disable 2608, delete 2610, help 2612, and full menu item 2616.

Figure 27:
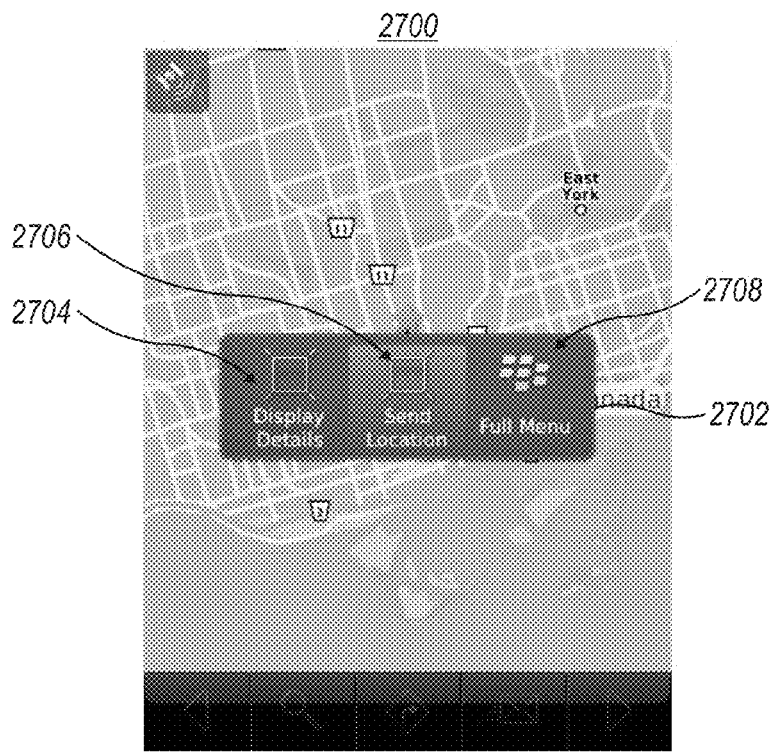
FIG. 27 is a graphical interface having a graphical context menu for a graphical map application in accordance with an exemplary embodiment.

Referring to FIG. 27, a graphical interface 2700 having a graphical context menu 2702 for a graphical map application in accordance with an exemplary embodiment is illustrated. As shown, the graphical context menu 2702 is automatically configured as a 1×3 grid with the default item 2706 being the send location menu item, along with the display details menu item 2704 and full menu item 2708.

Figure 28:
FIG. 28 is a graphical interface having a graphical context menu for a listing of map locations with a location highlighted in accordance with an exemplary embodiment.

Referring to FIG. 28, a graphical interface 2800 having a graphical context menu 2802 for a listing of map locations with a location 2804 highlighted in accordance with an exemplary embodiment is illustrated. As shown, the graphical context menu 2802 is automatically configured as a 1×3 grid with the default item 2808 being the send location menu item, along with the display details menu item 2806 and full menu item 2810.

Figure 29:
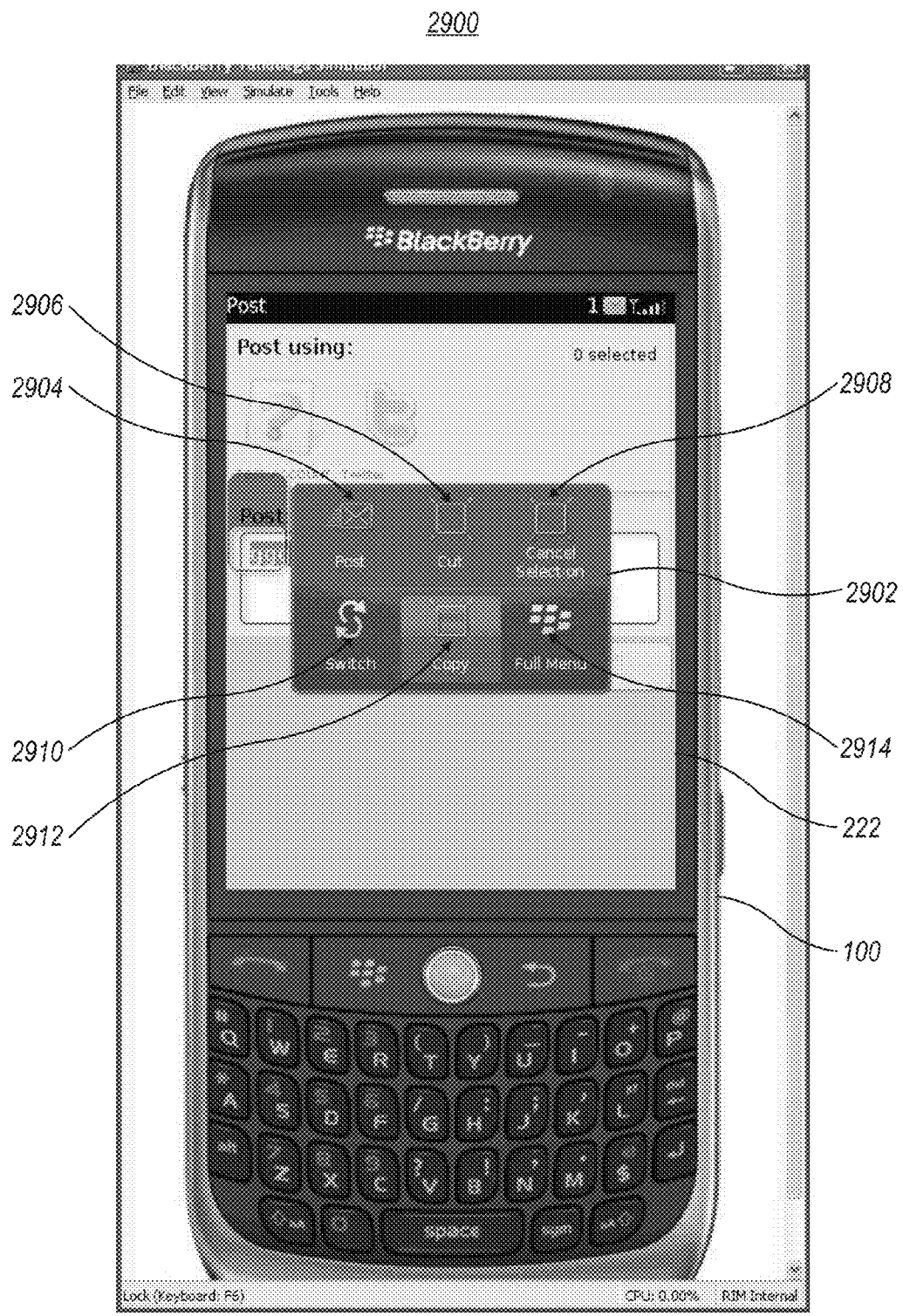
FIG. 29 is a graphical interface having a graphical context menu for a social network application (e.g., Twitter) in accordance with an exemplary embodiment.

Referring to FIG. 29, a graphical interface 2900 having a graphical context menu 2902 for a social network application (e.g., Twitter) in accordance with an exemplary embodiment is illustrated. As shown, the graphical context menu 2902 is automatically configured as a 2×3 grid with the default item 2912 being the copy menu item. The other menu items include post 2904, cut 2906, cancel selection 2908, switch 2910, and full menu item 2914. The graphical context menu 2902 is displayed on a display screen 222 of a mobile communication device 100.

Figure 30:
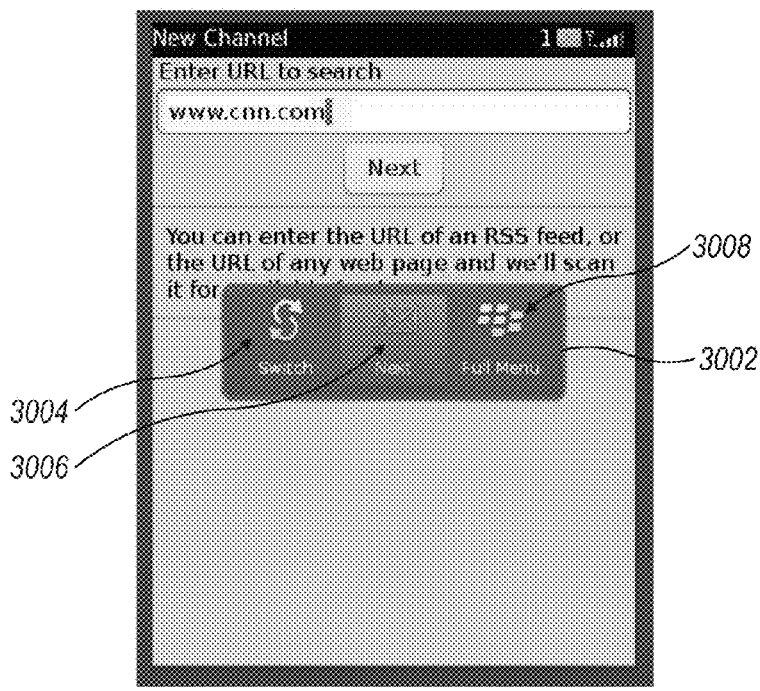
FIG. 30 is a graphical interface having a graphical context menu for a RSS feed application in accordance with an exemplary embodiment.

Referring to FIG. 30, a graphical interface 3000 having a graphical context menu 3002 for a RSS feed application in accordance with an exemplary embodiment is illustrated. As shown, the graphical context menu 3002 is automatically configured as a 1×3 grid with the default item 3006 being the next menu item, along with the switch menu item 3004 and full menu item 3008.

Figure 31:
FIG. 31 is a graphical interface having a graphical context menu for a search function for music application with a music file highlighted in accordance with an exemplary embodiment.

Referring to FIG. 31, a graphical interface 3100 having a graphical context menu 3102 for a search function for a media player application with a music file 3104 highlighted in accordance with an exemplary embodiment is illustrated. As shown, the graphical context menu 3102 is automatically configured as a 2×3 grid with the default item 3114 being the view menu item. The other menu items include add to playlist 3106, delete 3108, shuffle 3110, search 3112 and full menu item 3116.

Figure 32:
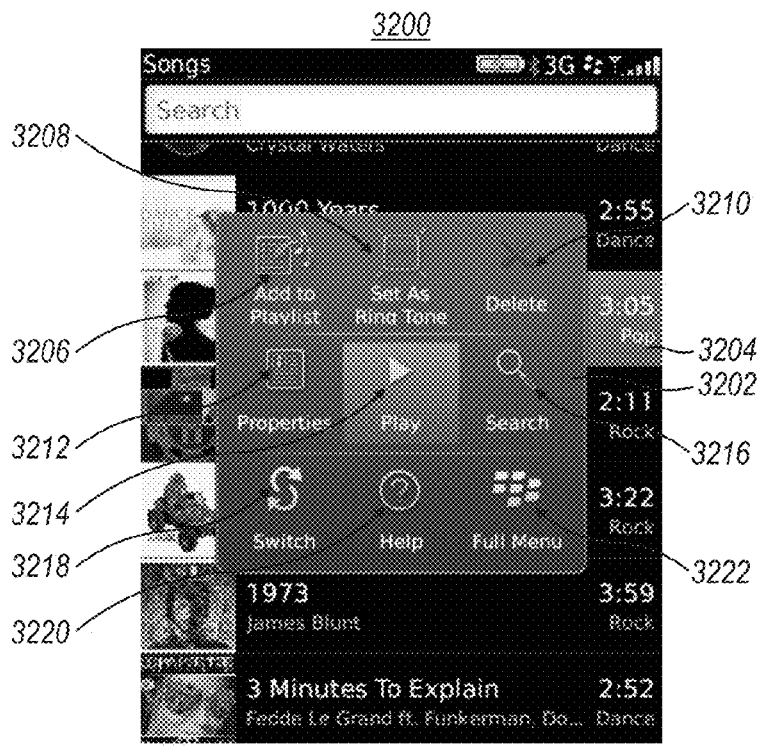
FIG. 32 is a graphical interface having a graphical context menu for a music application with a music file highlighted in accordance with an exemplary embodiment.

Referring to FIG. 32, a graphical interface 3200 having a graphical context menu 3202 for a music application with a music file 3204 highlighted in accordance with an exemplary embodiment is illustrated. As shown, the graphical context menu 3202 is automatically configured as a 3×3 grid with the default item 3214 being the play menu item. The other menu items include add to playlist 3206, set as ring tone 3208, delete 3210, properties 3212, search 3216, switch 3218, help 3220, and full menu item 3222.

Figure 33:
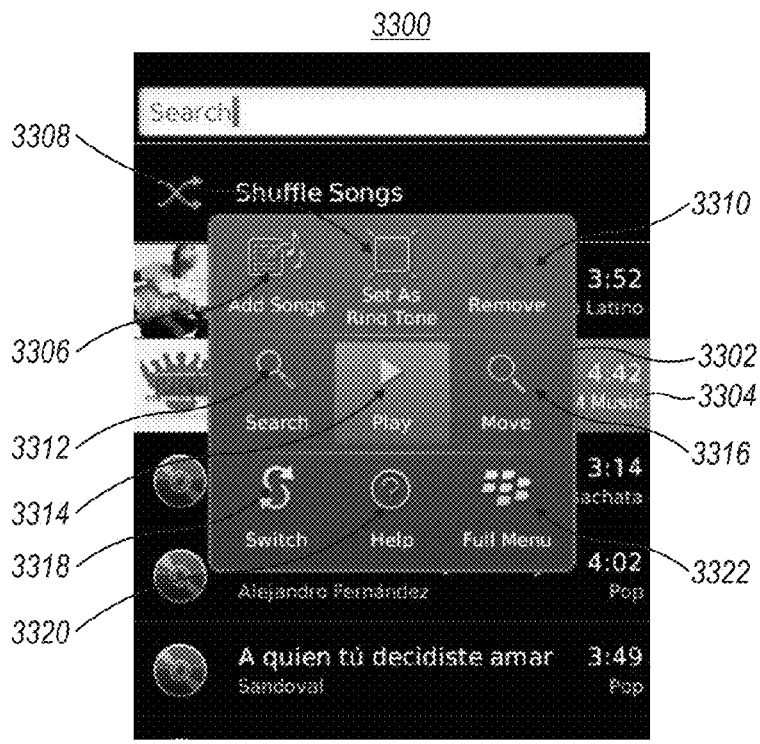
FIG. 33 is a graphical interface having a graphical context menu for a shuffle function for a music application with a music file highlighted in accordance with an exemplary embodiment.

Referring to FIG. 33, a graphical interface 3300 having a graphical context menu 3302 for a shuffle function for a music application with a music file 3304 highlighted in accordance with an exemplary embodiment is illustrated. As shown, the graphical context menu 3302 is automatically configured as a 3×3 grid with the default item 3314 being the play menu item. The other menu items include add songs 3306, set as ring tone 3308, remove 3310, search 3312, move 3316, switch 3318, help 3320, and full menu item 3322.

Figure 34:
FIG. 34 is a graphical interface having a graphical context menu for a selected song in a music application in accordance with an exemplary embodiment.

Referring to FIG. 34, a graphical interface 3400 having a graphical context menu 3402 for a selected song in a music application in accordance with an exemplary embodiment is illustrated. As shown, the graphical context menu 3402 is automatically configured as a 3×3 grid with the default item 3414 being the play menu item. The other menu items include add to playlist 3406, set as ring tone 3408, view artist 3410, view album 3412, delete 3416, switch 3418, help 3420, and full menu item 3422.

Figure 35:
FIG. 35 is a graphical interface having a graphical context menu for a new playlist function in a music application with a song highlighted in accordance with an exemplary embodiment.

Referring to FIG. 35, a graphical interface 3500 having a graphical context menu 3502 for a new playlist function in a music application with a song 3504 highlighted in accordance with an exemplary embodiment is illustrated. As shown, the graphical context menu 3502 is automatically configured as a 2×3 grid with the default item 3514 being the view menu item. The other menu items include delete 3506, rename 3508, search 3510, switch 3512, and full menu item 3516.

Figure 37:
FIG. 37 is a graphical interface having a graphical context menu for an email application displaying an email with an attachment highlighted in accordance with an exemplary embodiment.

Referring to FIG. 37, a graphical interface 3700 having a graphical context menu 3702 for an email application displaying an email with an attachment 3704 highlighted in accordance with an exemplary embodiment is illustrated. As shown, the focus 3706 (indicated as a circle) is on the highlighted attachment 3704. In response, a graphical context menu 3702 is automatically displayed as a 1×3 grid with the default item 3710 being the open menu item, along with the download menu item 3708 and full menu item 3712.

Figure 38:
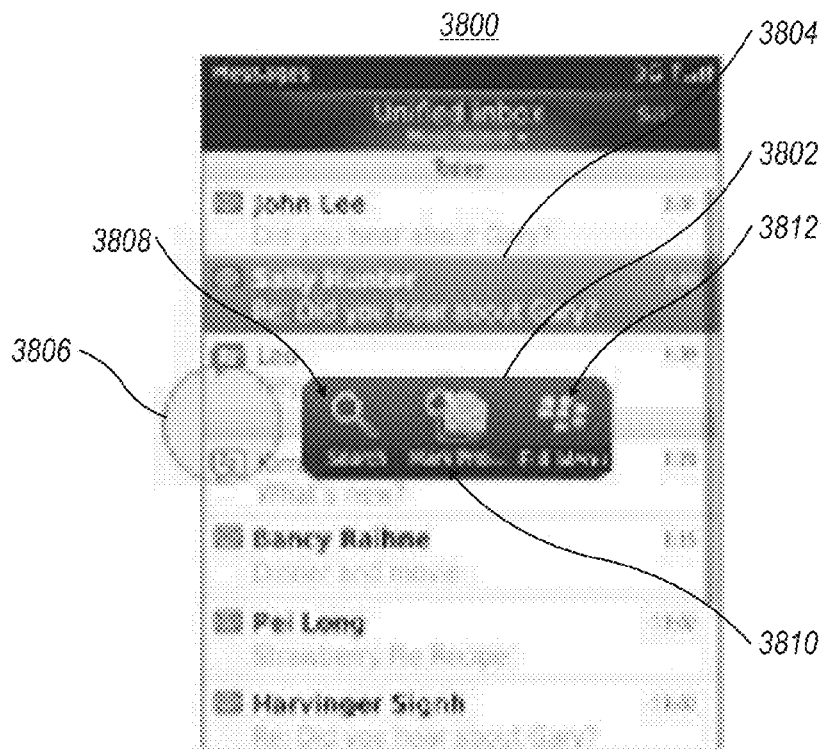
FIG. 38 is a graphical interface having a graphical context menu for an email application displaying an inbox with an email highlighted in accordance with an exemplary embodiment.

Referring to FIG. 38, a graphical interface 3800 having a graphical context menu 3802 for an email application displaying an inbox with an email 3804 highlighted in accordance with an exemplary embodiment is illustrated. As shown, the focus 3806 (indicated as a circle) is not on the highlighted email 3804. In response, a graphical context menu 3802 is automatically displayed as a 1×3 grid with the default item 3810 being the mark priority menu item, along with the search menu item 3808 and full menu item 3812.

Figure 39:
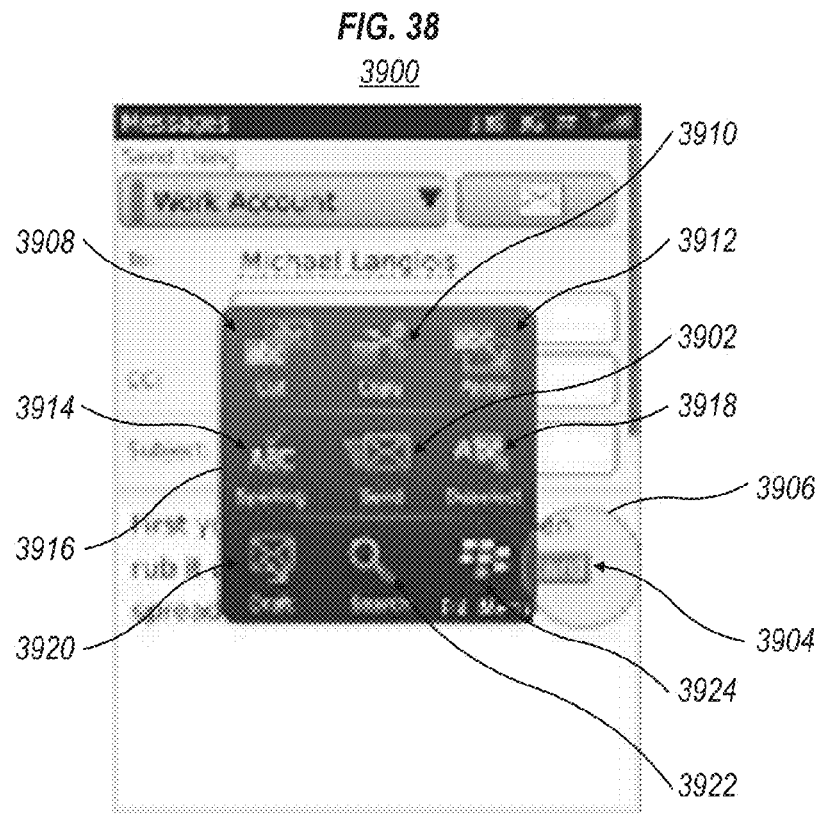
FIG. 39 is a graphical interface having a graphical context menu for a message application with a word in a message highlighted in accordance with an exemplary embodiment.

Referring to FIG. 39, a graphical interface 3900 having a graphical context menu 3916 for a message application with a word in a message 3904 highlighted in accordance with an exemplary embodiment is illustrated. As shown, the graphical context menu 3916 is automatically configured as a 3×3 grid with the default item 3902 being the send menu item. The other menu items include cut 3908, copy 3910, paste 3912, spelling 3914, deselect 3918, draft 3920, search 3922, and full menu item 3924.

Figure 40:
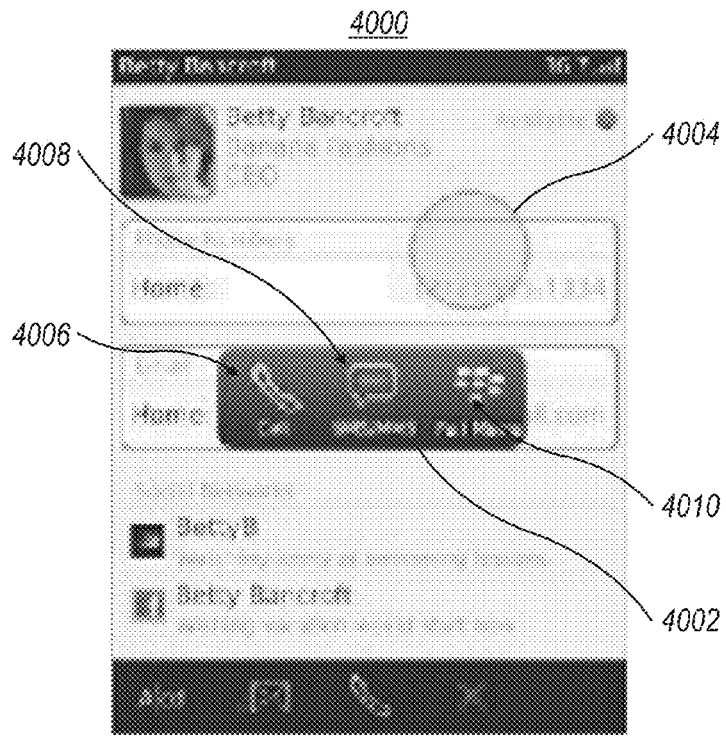
FIG. 40 is a graphical interface having a graphical context menu for a message application with the focus (indicated as a circle) on a telephone number for a contact in accordance with an exemplary embodiment.

Referring to FIG. 40, a graphical interface 4000 having a graphical context menu 4002 for a message application with the focus 4004 (indicated as a circle) on a telephone number for a contact in accordance with an exemplary embodiment is illustrated. As shown, the graphical context menu 4002 is automatically displayed as a 1×3 grid with the default item 4008 being the SMS/MMS menu item, along with the call menu item 4006 and full menu item 4010. In this example, the call menu item 4006 is not the default item despite the focus being on the phone number because the phone number was not highlighted.

Figure 41:
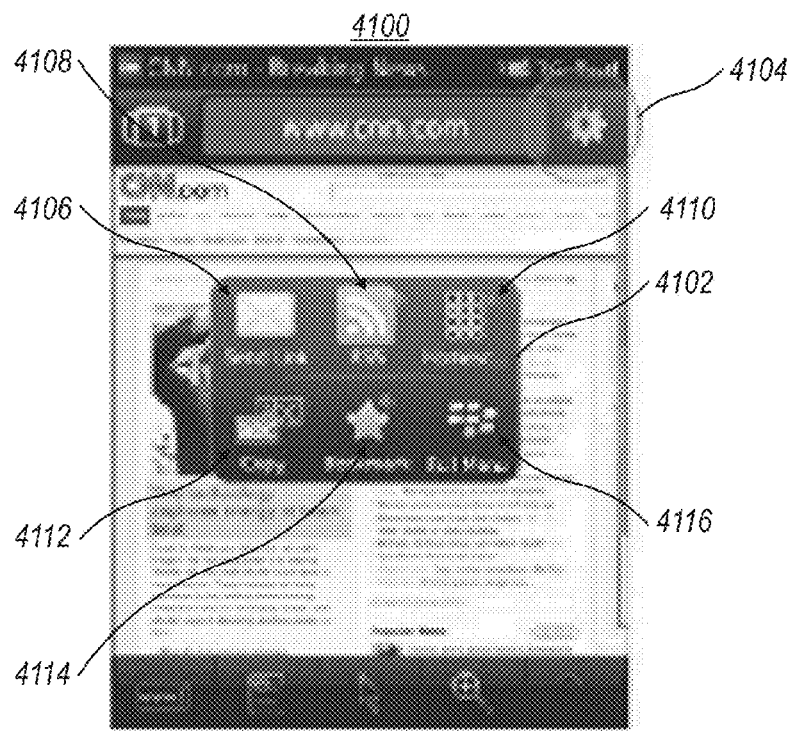
FIG. 41 is a graphical interface having a graphical context menu for a web browser application with the title of an article highlighted in accordance with an exemplary embodiment.

Referring to FIG. 41, a graphical interface 4100 having a graphical context menu 4102 for a web browser application with the title of an article 4104 highlighted in accordance with an exemplary embodiment is illustrated. As shown, the focus 4104 (indicated as a circle) is on the RSS feed icon 4104. In response, a graphical context menu 4102 is automatically displayed as a 2×3 grid with the default item 4114 being the bookmark menu item. The other menu items include send link 4106, RSS 4108, homescreen 4110, copy 4112, and full menu item 4116.

Figure 42:
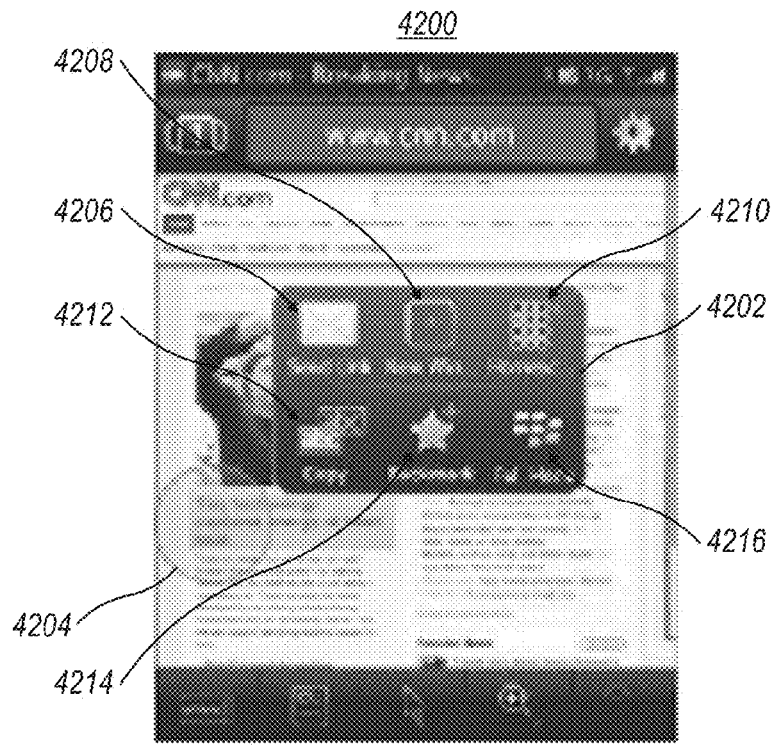
FIG. 42 is a graphical interface having a graphical context menu for a web browser application with the title of an article highlighted in accordance with an exemplary embodiment.

Referring to FIG. 42, a graphical interface 4200 having a graphical context menu 4202 for a web browser application with the title of an article 4204 highlighted in accordance with an exemplary embodiment is illustrated. As shown, the focus (indicated as a circle) is on the highlighted title of the article 4204. In response, a graphical context menu 4202 is automatically displayed as a 2×3 grid with the default item 4214 being the bookmark menu item. The other menu items include send link 4206, new window 4208, homescreen 4210, copy 4212, and full menu item 4216. Comparing the graphical context menus of FIGS. 41 and 42, the menus have different menu items due to the focus not being on the highlighted item in FIG. 41 and being on the highlighted item in FIG. 42.

Figure 43:
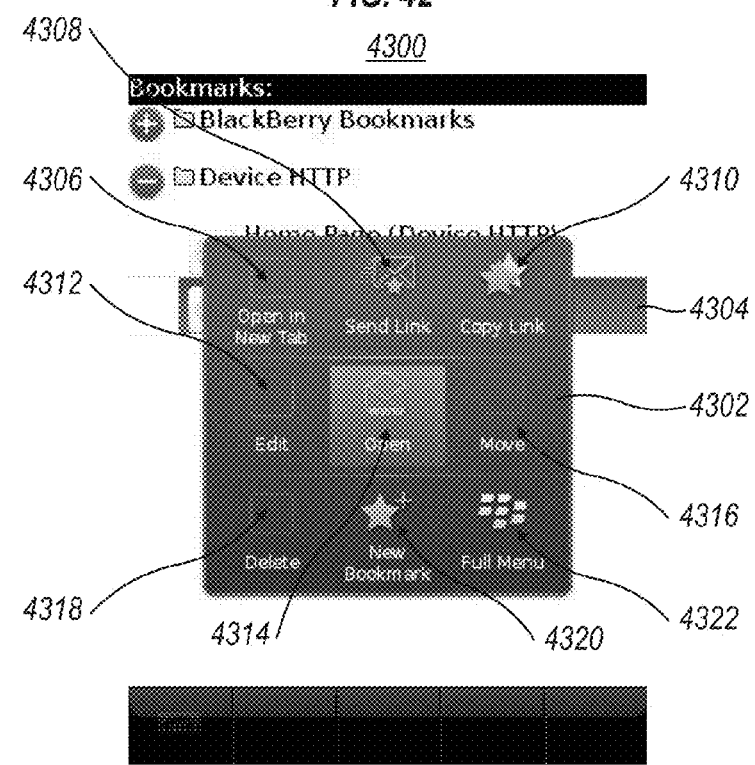
FIG. 43 is a graphical interface having a graphical context menu for a bookmark application in accordance with an exemplary embodiment.

Referring to FIG. 43, a graphical interface 4300 having a graphical context menu 4302 for a bookmark function in a web browser application in accordance with an exemplary embodiment is illustrated. As shown, the graphical context menu 4302 is automatically configured as a 3×3 grid with the default item 4314 being the open menu item. The other menu items include open in new tab 4306, send link 4308, copy link 4310, edit 4312, move 4316, delete 4318, new bookmark 4320, and full menu item 4322.

Figure 44:
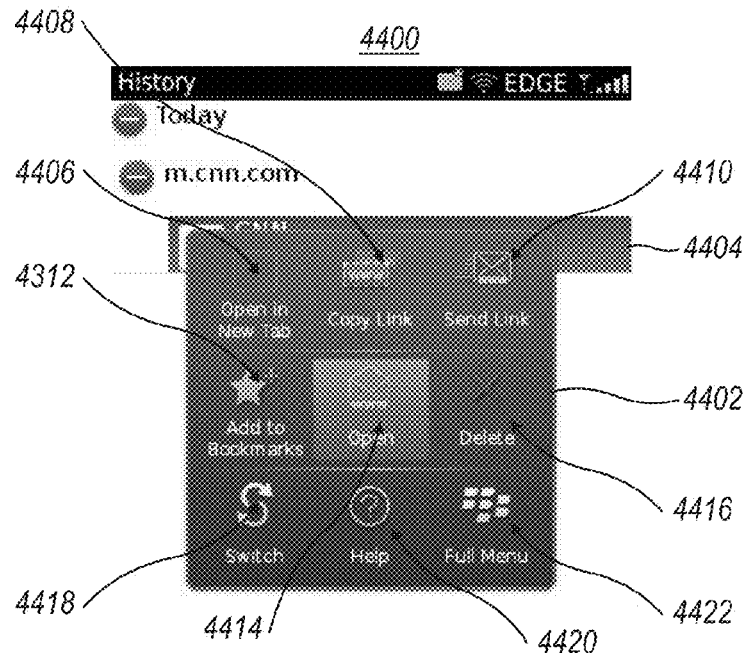
FIG. 44 is a graphical interface having a graphical context menu for a history application with an entry, e.g., CNN, highlighted in accordance with an exemplary embodiment.

Referring to FIG. 44, a graphical interface 4400 having a graphical context menu 4402 for a history function in a web browser application with an entry 4404, e.g., CNN, highlighted in accordance with an exemplary embodiment is illustrated. As shown, the graphical context menu 4402 is automatically configured as a 3×3 grid with the default item 4414 being the open menu item. The other menu items include open in new tab 4406, copy link 4408, send link 4410, add to bookmarks 4412, delete 4416, switch 4418, help 4420, and full menu item 4422.

Figure 45:
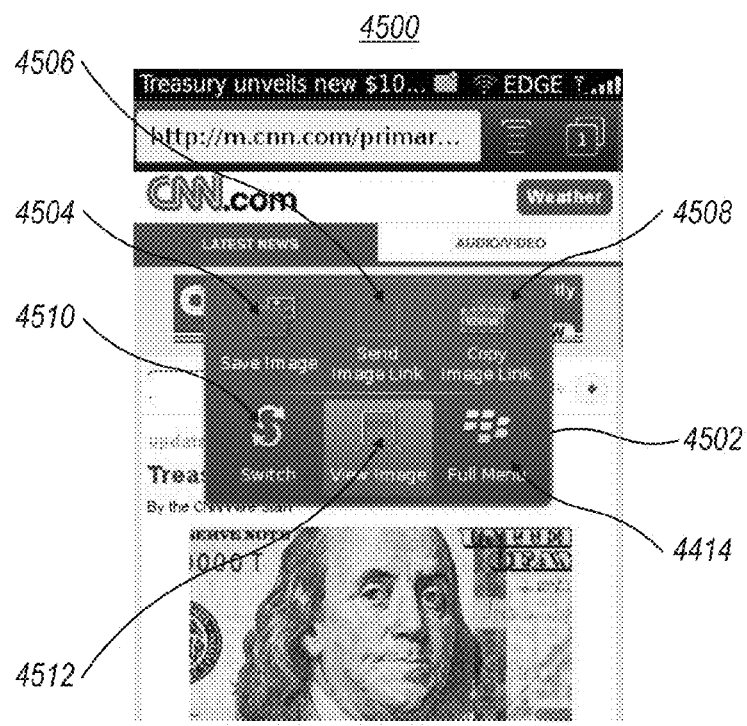
FIG. 45 is a graphical interface having a graphical context menu for a web browser application with an image highlighted (not shown) in accordance with an exemplary embodiment.

Referring to FIG. 45, a graphical interface 4500 having a graphical context menu 4502 for a web browser application with an image highlighted (not shown) in accordance with an exemplary embodiment is illustrated. As shown, the graphical context menu 4502 is automatically configured as a 2×3 grid with the default item 4512 being the view image menu item. The other menu items include save image 4504, send image link 4506, copy image link 4508, switch 4510, and full menu item 4414.

Figure 46:
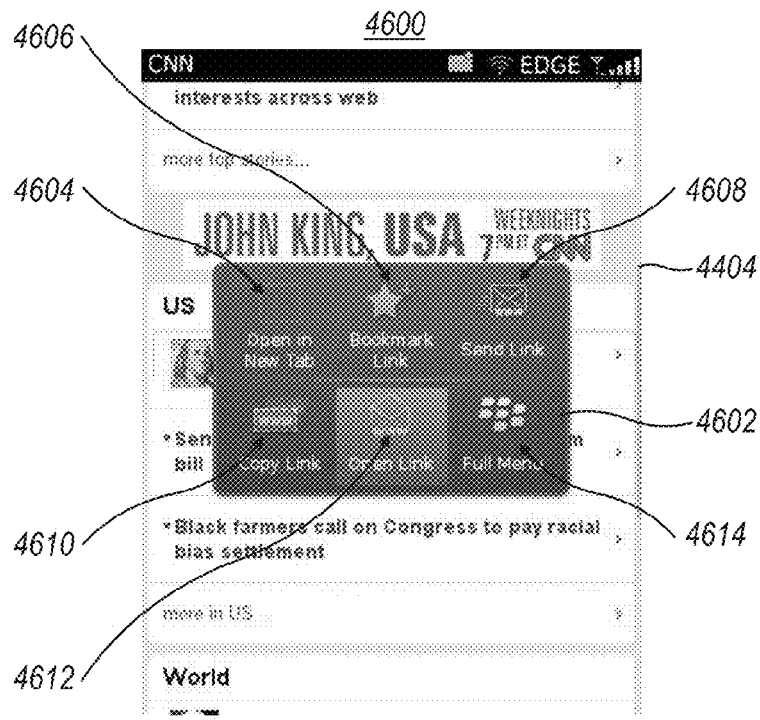
FIG. 46 is a graphical interface having a graphical context menu for a web browser application with a link highlighted (not shown) in accordance with an exemplary embodiment.

Referring to FIG. 46, a graphical interface 4600 having a graphical context menu 4602 for a web browser application with a text link highlighted (not shown) in accordance with an exemplary embodiment is illustrated. As shown, the graphical context menu 4602 is automatically configured as a 2×3 grid with the default item 4612 being the open link menu item. The other menu items include open in new tab 4604, bookmark link 4606, send link 4608, copy link 4610, and full menu item 4612. Comparing the graphical context menus of FIGS. 45 and 46, the menus have different menu items due to different context items highlighted.

Figure 47:
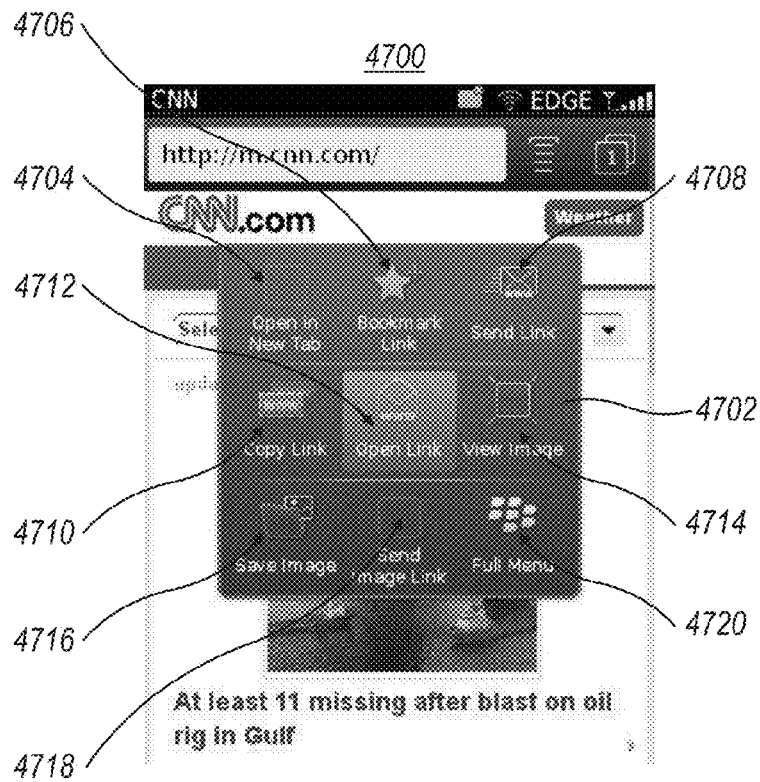
FIG. 47 is a graphical interface having a graphical context menu for a browser application with a link highlighted (not shown) in accordance with an exemplary embodiment.

Referring to FIG. 47, a graphical interface 4700 having a graphical context menu 4702 for a browser application with a text link with an image highlighted (not shown) in accordance with an exemplary embodiment is illustrated. As shown, the graphical context menu 4702 is automatically configured as a 3×3 grid with the default item 4712 being the open link menu item. The other menu items include open in new tab 4704, bookmark link 4706, send link 4708, copy link 4710, view image 4714, save image 4716, send image link 4718, and full menu item 4720. Comparing the graphical context menus of FIGS. 46 and 47, the menus are different because the highlighted items are different: text link and text link with an image.

Figure 48:
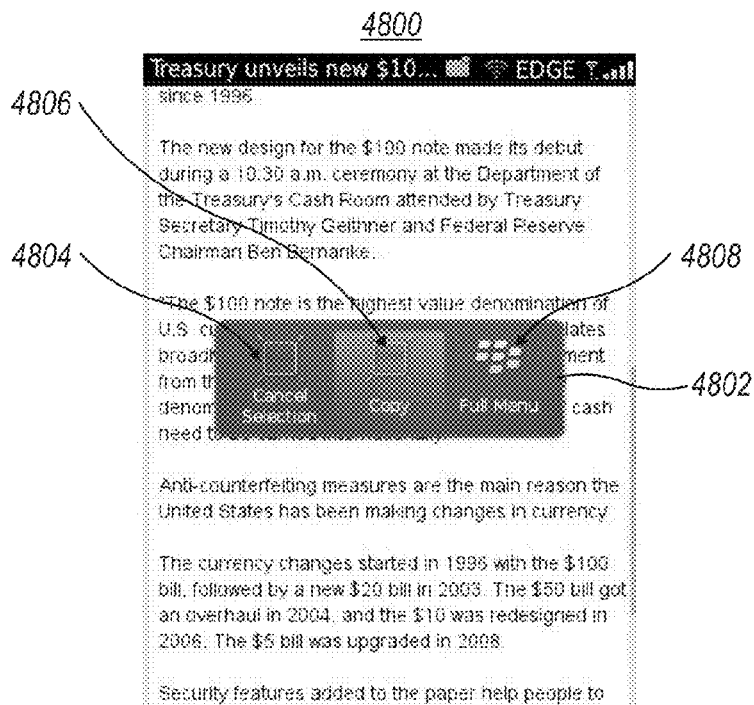
FIG. 48 is a graphical interface having a graphical context menu for an email application with text highlighted (not shown) in accordance with an exemplary embodiment.

Referring to FIG. 48, a graphical interface 4800 having a graphical context menu 4802 for a web browser application with text highlighted (not shown) in accordance with an exemplary embodiment is illustrated. As shown, the graphical context menu 4802 is automatically configured as a 1×3 grid with the default item 4806 being the copy menu item, along with the cancel selection menu item 4804 and full menu item 4808.

Figure 49:
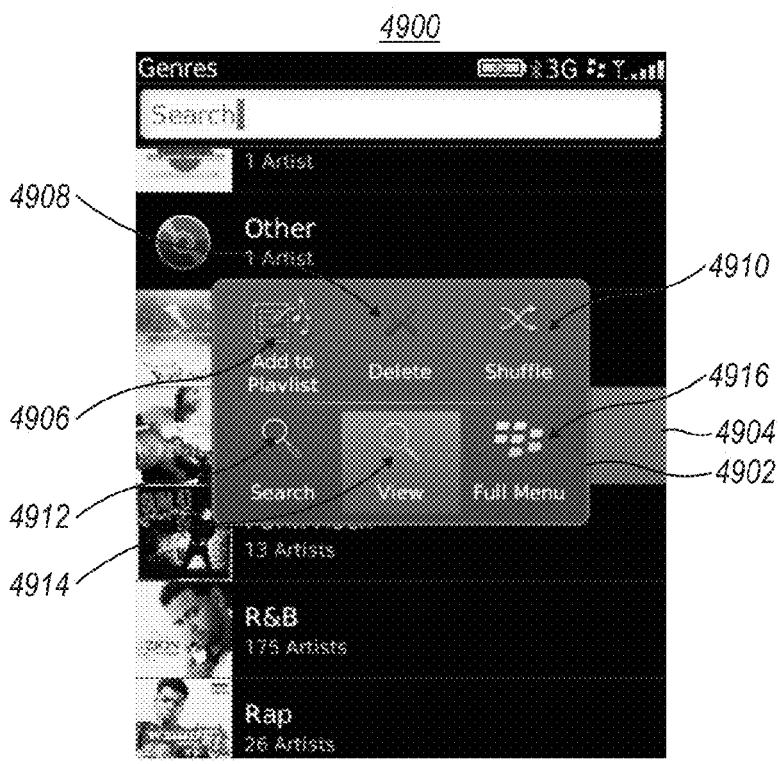
FIG. 49 is a graphical interface having a graphical context menu for a music application with an artist highlighted in accordance with an exemplary embodiment.

Referring to FIG. 49, a graphical interface 4900 having a graphical context menu 4902 for a media player application with an artist 4904 highlighted in accordance with an exemplary embodiment is illustrated. As shown, the graphical context menu 4902 is automatically configured as a 2×3 grid with the default item 4914 being the view menu item. The other menu items include add to playlist 4906, delete 4908, shuffle 4910, search 4912, view 4914, and full menu item 4916.

Figure 50:
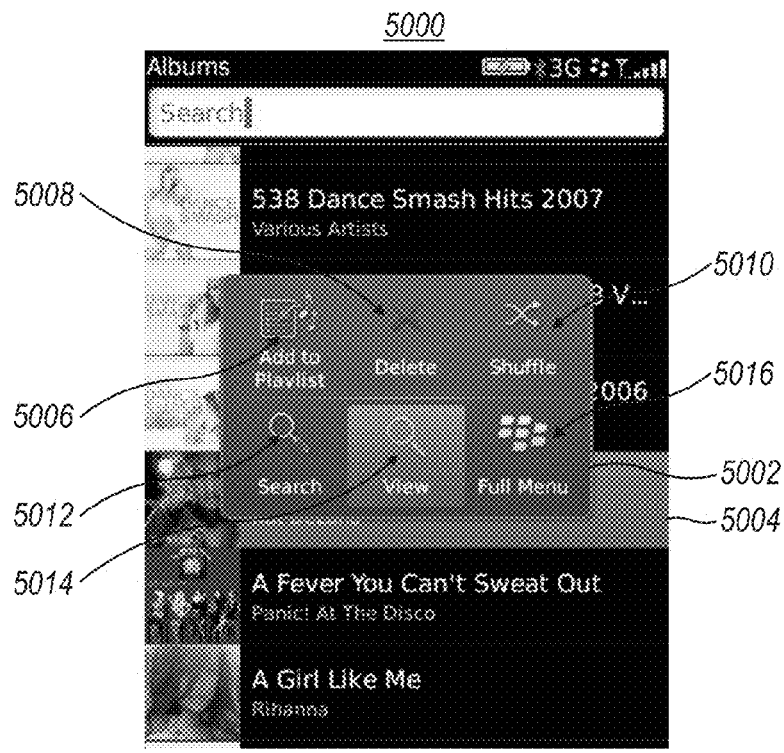
FIG. 50 is a graphical interface having a graphical context menu for a music application with an album highlighted in accordance with an exemplary embodiment.

Referring to FIG. 50, a graphical interface 5000 having a graphical context menu 5002 for a media player application with an album 5004 highlighted in accordance with an exemplary embodiment is illustrated. As shown, the graphical context menu 5002 is automatically configured as a 2×3 grid with the default item 5014 being the view menu item. The other menu items include add to playlist 5006, delete 5008, shuffle 5010, search 5012, view 5014, and full menu item 5016.

Figure 51:
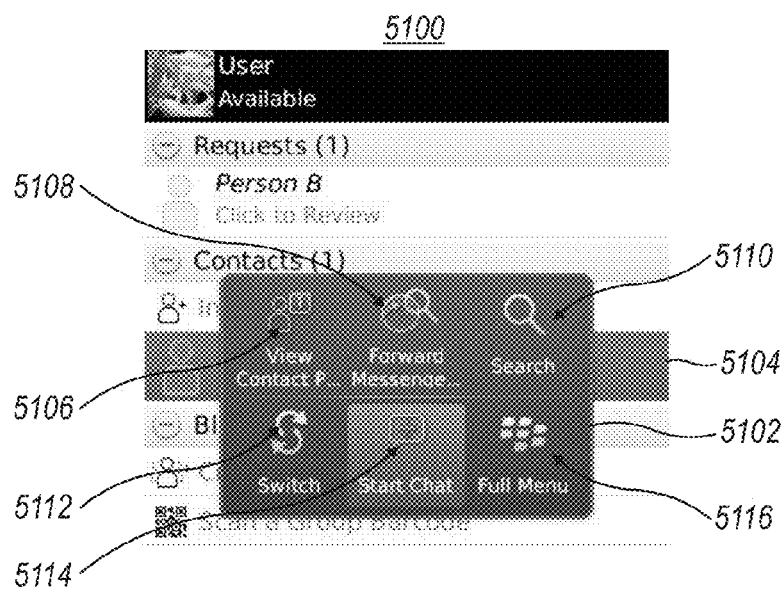
FIG. 51 is a graphical interface having a graphical context menu with a contact highlighted in accordance with an exemplary embodiment.

Referring to FIG. 51, a graphical interface 5100 having a graphical context menu 5102 with a contact 5104 highlighted in accordance with an exemplary embodiment is illustrated. As shown, the graphical context menu 5102 is automatically configured as a 2×3 grid with the default item 5114 being the start chat item. The other menu items include view contact picture 5106, forward message 5108, search 5110, switch 5112, and full menu item 5116.

The technology can take the form of an entirely hardware embodiment, an entirely software embodiment or an embodiment containing both hardware and software elements. In one embodiment, the technology is implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For example, method 600 can be a computer program product or can be program code on a computer-readable medium. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Both processors and program code for implementing each as aspect of the technology can be centralized or distributed (or a combination thereof) as known to those skilled in the art.

A data processing system suitable for storing program code and for executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Exemplary embodiments have been described hereinabove regarding the implementation of a smart card receiving assembly for a mobile communication device. Various modifications to and departures from the disclosed embodiments will occur to those having skill in the art. The subject matter that is intended to be within the spirit of this disclosure is set forth in the following claims.

What is claimed is:

1. A method for displaying a graphical context menu on a display screen of a communication device, the method comprising:
   receiving a menu request;
   selecting, based on a context of the menu request, a subset of menu items from a complete set of menu items available for the context;
   determining a number of slots for a graphical context menu based on a number of menu items selected in the subset of menu items;
   comparing the number of slots for the graphical context menu to the number of menu items;
   obtaining at least one filler menu item from the complete set of menu items, the at least one filler menu item not being included in the subset of menu items;
   inserting the subset of menu items and the at least one filler menu item into selected slots in the graphical context menu; and
   rendering the graphical context menu on the display screen with the menu items and the at least one filler menu item.

2. The method of claim 1 wherein the graphical context menu further comprises a menu item for displaying a full menu.

3. The method of claim 2 further comprising rendering, in response to actuating the menu item for displaying the full menu, a graphical list of menu items which includes menu items not displayed in the graphical context menu.

4. The method of claim 2 further comprising rendering, in response to actuating the menu item for displaying the full menu, a graphical list of menu items which includes menu items in addition to the menu items displayed in the graphical context menu.

5. The method of claim 2 wherein the menu item for displaying the full menu is displayed in a bottom right slot of the graphical context menu.

6. The method of claim 1 wherein determining the number of slots for the graphical context menu includes generating a grid in accordance with the number of slots, the grid being one of: a three column by three row grid, a three column by two row grid, and a three column by one row grid.

7. The method of claim 1 wherein selecting the subset of menu items includes identifying a default item, based on the context of the menu request, which is displayed in a center of graphical context menu.

8. The method of claim 1 wherein selecting the subset of menu items further comprises determining the context of the menu request and identifying menu items associated with the context of the menu request.

9. The method of claim 1 wherein selecting the subset of menu items further comprises eliminating menu items that are unavailable from the number of menu items.

10. The method of claim 1 wherein inserting the subset of menu items and the at least one filler menu item into the slots of the graphical context menu further includes inserting one or more filler items into the graphical context menu to complete the graphical context menu.

11. A communication device programmed to render a graphical context menu on a display screen of the communication device in response to receiving a menu request, said communication device comprising:
   the display screen configured to render the graphical context menu over an application currently being displayed on the display screen; and
   a microprocessor in signal communication with the display screen, the microprocessor having a menu program associated therewith for controlling operation of said communication device, said menu program configured to:
      receive a menu request;
      select, based on a context of the menu request, a subset of menu items from a complete set of menu items available for the context;
      determine a number of slots for the graphical context menu based on a number of menu items selected in the subset of menu items;
      compare the number of slots for the graphical context menu to the number of menu items;
      obtain at least one filler item from the complete set of menu items, the at least one filler item not being included in the subset of menu items;
      insert the subset of menu items and the at least one filler menu item into selected slots in the graphical context menu; and
      render the graphical context menu on the display screen with the menu items and the at least one filler menu item.

12. The communication device of claim 11 wherein the graphical context menu further comprises a menu item for displaying a full menu.

13. The communication device of claim 12 wherein the menu program is further configured to render, in response to actuating the menu item for displaying the full menu, a graphical list of menu items which includes menu items not displayed in the graphical context menu.

14. The communication device of claim 12 wherein the menu program is further configured to render, in response to actuating the menu item for displaying the full menu, a graphical list of menu items which includes menu items in addition to the menu items displayed in the graphical context menu.

15. The communication device of claim 14 wherein the menu item for displaying the full menu is displayed in a bottom right slot of the graphical context menu.

16. The communication device of claim 11 wherein determining the number of slots for the a graphical context menu includes generating a grid in accordance with the number of slots, the grid being one of: a three column by three row grid, a three column by two row grid, and a three column by one row grid.

17. The communication device of claim 11 wherein the selecting the subset of menu items includes identifying a default item, based on the context of the menu request, which is displayed in a center of graphical context menu.

18. The communication device of claim 11 wherein selecting the subset of menu items further comprises determining the context of the menu request and identifying menu items associated with the context of the menu request.

19. The communication device of claim 18 wherein selecting the subset of menu items further comprises eliminating menu items that are unavailable from the number of menu items.

20. The communication device of claim 11 wherein inserting the subset of menu items and the at least one filler menu item into the graphical context menu further includes inserting one or more filler items into the graphical context menu to complete the graphical context menu.

* * * * *